US012710345B2

(12) United States Patent
Catterall et al.

(10) Patent No.: US 12,710,345 B2
(45) Date of Patent: Aug. 18, 2026

(54) METHODS AND SYSTEMS OF DETERMINING A VISCOSITY OF LIQUID SAMPLES

(71) Applicant: AMGEN INC., Thousand Oaks, CA (US)

(72) Inventors: Hannah Beth Catterall, Santa Monica, CA (US); Iain David Grant Campuzano, Thousand Oaks, CA (US)

(73) Assignee: AMGEN INC., Thousand Oaks, CA (US)

( * ) Notice: Subject to any disclaimer, the term of this patent is extended or adjusted under 35 U.S.C. 154(b) by 312 days.

(21) Appl. No.: 18/035,587

(22) PCT Filed: Nov. 23, 2021

(86) PCT No.: PCT/US2021/060422
§ 371 (c)(1),
(2) Date: May 5, 2023

(87) PCT Pub. No.: WO2022/109434
PCT Pub. Date: May 27, 2022

(65) Prior Publication Data

US 2024/0044762 A1 Feb. 8, 2024

Related U.S. Application Data

(60) Provisional application No. 63/160,359, filed on Mar. 12, 2021, provisional application No. 63/117,207, filed on Nov. 23, 2020.

(51) Int. Cl.
*G01N 11/02* (2006.01)
*G01N 11/00* (2006.01)

(52) U.S. Cl.
CPC ...... *G01N 11/02* (2013.01); *G01N 2011/0073* (2013.01)

(58) Field of Classification Search
CPC ........... G01N 11/02; G01N 2011/0073; G01N 29/032; G01N 29/036; G01N 2291/02818; G01N 2011/006
(Continued)

(56) References Cited

U.S. PATENT DOCUMENTS 10,156,499 B1 * 12/2018 Stearns ............... H01J 49/0454
2002/0125424 A1 9/2002 Ellson et al.
(Continued)

FOREIGN PATENT DOCUMENTS

JP H0298651 * 4/1990
WO WO-2020/092407 A1 5/2020

OTHER PUBLICATIONS

International Search Report and Written Opinion, International Application No. PCT/US2021/060422, dated Mar. 4, 2022.
(Continued)

*Primary Examiner* — Robert R Raevis
(74) *Attorney, Agent, or Firm* — MARSHALL, GERSTEIN & BORUN LLP

(57) ABSTRACT

Methods and systems for determining a viscosity of liquid samples are provided. The methods and systems utilize an acoustic liquid handler. The acoustic liquid handler has a first location adapted to receive a liquid sample. The acoustic liquid handler is configured to apply one or more acoustic signals to the liquid sample in the first location until a specified amount of the liquid sample has been transferred from the first location to a second location of the acoustic liquid handler. The acoustic liquid handler has a controller configured to determine the viscosity of the liquid sample based on a number of acoustic signals required to transfer the specified amount of the liquid sample from the first location to the second location.

25 Claims, 15 Drawing Sheets

(58) Field of Classification Search
USPC .............................................. 73/54.01, 54.41
See application file for complete search history.

(56) References Cited

U.S. PATENT DOCUMENTS

2013/0305816 A1* 11/2013 Choi ...................... G01N 11/10
73/54.41
2016/0274067 A1* 9/2016 Walker ................. G01N 29/222

OTHER PUBLICATIONS

Kremer et al., "Simultaneous measurement of surface tension and viscosity using freely decaying oscillations of acoustically levitated droplets", Review of Scientific Instruments, American Institute of Physics, 2 Huntington Quadrangle, Melville, NY 11747, vol. 89, No. 1, Jan. 22, 2018.
Babur et al., "Moving liquids with sound: the physics of acoustic droplet ejection for robust laboratory automation in life sciences", Journal of Laboratory Automation, vol. 21, No. 1, pp. 4-18, Jan. 1, 2016.
Gillis et al., "Theory of the Greenspan viscometer", The Journal of the Acoustical Society of America, American Institute of Physics, 2 Huntington Quadrangle, Melville, NY 11747, vol. 114, No. 1, pp. 166-173, Jul. 1, 2003.
He et al., "High-throughput dynamic light scattering method for measuring viscosity of concentrated protein solutions", Analytical Biochemistry, Academic Press, Amsterdam, NL, vol. 399, No. 1, pp. 141-143, Apr. 1, 2010.
"Echo 525 Liquid Handler User Guide Server Version 2.6", Labcyte Inc., Feb. 2018.

* cited by examiner

100

Fit Group

Bivariate Fit of Total Iterations By Viscosity at measured concentration

Linear Fit

Linear Fit

Total Iterations = 36.18968 + 3.4850107*Viscosity at measured concentration

Summary of Fit

| | |
|---|---|
| RSquare | 0.896908 |
| RSquare Adj | 0.89519 |
| Root Mean Square Error | 9.793203 |
| Mean of Response | 87.79032 |
| Observations (or Sum Wgts) | 62 |

Linear Fit

New EjectAmp(Volt) = 1.9403988 + 0.0522345*Viscosity at measured concentration

Summary of Fit

| | |
|---|---|
| RSquare | 0.873549 |
| RSquare Adj | 0.871442 |
| Root Mean Square Error | 0.164724 |
| Mean of Response | 2.713806 |
| Observations (or Sum Wgts) | 62 |

Linear Fit

Power Difference(Volt) = 0.1018303 + 0.0610953*Viscosity at measured concentration

Summary of Fit

| | |
|---|---|
| RSquare | 0.859205 |
| RSquare Adj | 0.856858 |
| Root Mean Square Error | 0.204992 |
| Mean of Response | 1.006435 |
| Observations (or Sum Wgts) | 62 |

METHODS AND SYSTEMS OF DETERMINING A VISCOSITY OF LIQUID SAMPLES

FIELD OF DISCLOSURE

The present disclosure is directed to systems and methods of determining viscosity of small amounts of liquid samples, for example a protein.

BACKGROUND

In life sciences, it may be necessary to measure the viscosity of liquid samples comprising protein. High confidence in these viscosity measurements is often critical to the research being performed and the development of therapeutic protein products. The cone and plate method is commonly used to measure the viscosity in these situations. The cone and plate method is a dynamic viscosity measurement method that measures the viscosity of a sample based on varied applied rotational shear stress and shear rates. The cone and plate method is appreciated by those with ordinary skill in the art as generally being highly precise and accurate. Other methods of viscosity measurement, e.g., Rheosense Initium and Malvern Viscosizer, may also be used.

The process of moving liquids with the application of acoustic signals is known as Acoustic Droplet Ejection (ADE). Further details about ADE are discussed in B. Hadimioglu, R. Stearns, and R. Ellson, "Moving Liquids with Sound: The Physics of Acoustic Droplet Ejection for Robust Laboratory Automation in Life Sciences," J Lab Autom., vol. 21, no. 1, pp. 4-18, February 2016, doi: 10.1177/2211068215615096, which is incorporated herein by reference.

SUMMARY

One aspect of the present disclosure provides a method including (a) positioning the sample of the protein in a first location of an acoustic liquid handler; (b) applying, using the acoustic liquid handler, one or more first acoustic signals until a specified amount of the sample has been transferred from the first location to a second location of the acoustic liquid handler; and (c) determining the viscosity of the sample based on a number of the one or more first acoustic signals required to transfer the specified amount of the sample from the first location to the second location. Additionally or alternatively, the viscosity may be determined based on any of (i) SubEject Power (dB) required to transfer the specified amount of the sample to the second location, (ii) SubEjectAmp (Volt) required to transfer the specified amount of the sample to the second location, (iii) New EjectAmp (Volt) required to transfer the specified amount of the sample to the second location, (iv) New EjectAmp+ThreshdB (Volt) required to transfer the specified amount of the sample to the second location, and/or (v) Power Difference (Volt) required to transfer the specified amount of the sample to the second location.

Another aspect of the present disclosure provides a method including (a) positioning the sample of the protein in a first location of an acoustic liquid handler; (b) iteratively applying, using the acoustic liquid handler, one or more acoustic signals to the sample in the first location until it is determined that a specified amount of sample has been transferred from the first location to the second location; and (c) determining the viscosity of the sample based on a number of iterations required to transfer the specified amount of the sample to the second location. Additionally or alternatively, the viscosity may be determined based on SubEject Power (dB), SubEjectAmp (Volt), New EjectAmp (Volt), a sum of New EjectAmp+ThreshdB (Volt), or Power Difference (Volt) required to transfer the specified amount of the sample to the second location.

Another aspect of the present disclosure is an acoustic liquid handler. The acoustic liquid handler has a first location with one or more wells adapted to receive a sample. The acoustic liquid handler is configured to apply one or more first acoustic signals to the sample in the first location until a specified amount of the sample has been transferred from the first location to a second location of the acoustic liquid handler. The acoustic liquid handler has a controller configured to determine the viscosity of the sample based on a number of first acoustic signals required to transfer the specified amount of the sample from the first location to the second location. Additionally or alternatively, the viscosity may be determined based on SubEject Power (dB) required to transfer the specified amount of the sample to the second location, SubEjectAmp (Volt) required to transfer the specified amount of the sample to the second location, New EjectAmp (Volt) required to transfer the specified amount of the sample to the second location, New EjectAmp+ThreshdB (Volt) required to transfer the specified amount of the sample to the second location, or Power Difference (Volt) required to transfer the specified amount of the sample to the second location.

In further accordance with any one or more of the foregoing aspects, the method and/or the acoustic liquid handler may further include any one or more of the following preferred forms.

In some forms, the specified amount of the sample to be transferred is all or substantially all of the sample.

In some forms, the specified amount of the sample to be transferred is a minimum amount of the sample required to create a displacement along one or more axes of a meniscus of a portion of the sample remaining in the first location.

In some forms, the controller is configured to measure an amount of the sample transferred using a fluid measurement technique.

In some forms, the controller is configured to determine the viscosity of the sample based on the set of parameters of the first acoustic signal.

In some forms, the parameters include at least two of a frequency, a power, an amplitude, a wavelength, a bandwidth, and a period.

In some forms, the one or more first acoustic signals each have a frequency in the range of 1 mHz to 5 mHz, such as 1 to 4 mHz or 1.5 to 3 mHz. In some forms, the one or more first acoustic signals each have a power in the range of 0.5 dB to 2.5 dB, such as 1-2 dB or 1-1.5 dB. In some forms, the controller is configured to vary a set of parameters of the acoustic liquid handler until the specified amount of sample has been transferred.

In some forms, the controller is configured to iteratively increase the frequency of the first acoustic signal.

In some forms, the controller is configured to iteratively increase the frequency of the first acoustic signals by no more than 0.1 Hz or no more than 0.05 Hz per iteration.

In some forms the controller determines whether the specified amount of the sample has been transferred.

In some forms, the controller determines whether the specified amount of the sample has been transferred by: applying one or more second acoustic signals to a first portion of the sample not transferred from the first location; determining an amount of the first portion of the sample not transferred based on the application of the one or more second acoustic signals; determining an amount of a second portion of the sample transferred based on the determination of the amount of the first portion of the sample not transferred; and comparing the amount of the second portion and/or first portion of the sample to the specified amount of the sample to be transferred.

In some forms, the amount of the first portion of the sample not transferred is determined based on an impression that forms on a meniscus of the first portion of the sample not transferred responsive to the application of the one or more second acoustic signals.

In some forms, the sample has a volume of at least 12 μL and no more than 80 μL.

In some forms, the sample has a volume of approximately 30 μL.

In some forms, the sample has a volume of approximately 20 μL.

In some forms, the first location is a first well of a source plate removably disposed in the acoustic liquid handler and the second location is a first well of a destination plate removably disposed in the acoustic liquid handler, wherein the first well of the destination plate is inverted with respect to the first well of the source plate.

In some forms, the controller determines the viscosity of the sample by comparing the number of the one or more acoustic signals to a predetermined relationship between the number of the one or more first acoustic signals and the viscosity for the set of parameters of the one or more first acoustic signals. For example, in some forms, the controller is calibrated based on a predetermined relationship between viscosity for a standard or known substance (e.g. cone-plate derived cP) and the number of first acoustic signals required to transfer the specified amount of the standard or known substance (e.g., acoustic iterations). In some forms, the controller may be calibrated based on a predetermined relationship between viscosity for a standard or known substance (e.g. cone-plate derived cP) and SubEject Power (dB) required to transfer the specified amount of the standard or known substance, SubEjectAmp (Volt) required to transfer the standard or known substance, New EjectAmp (Volt) required to transfer the specified amount of the standard or known substance, New EjectAmp+ThreshdB (Volt) required to transfer the specified amount of the standard or known substance, and/or Power Difference (Volt) required to transfer the specified amount of the standard or known substance. The calibrated controller may be used to determine the viscosity of one or more samples, including samples of unknown composition and/or unknown viscosity. The one or more samples may be different from each other. The determinations of viscosity for the one or more samples may be made without further calibration of the controller.

In some forms, the controller updates the predetermined relationship for the set of parameters based on the number of the one or more first acoustic signals and the determined viscosity of the sample.

In some forms, a mass spectrometry apparatus configured to generate mass spectrometric data from the sample, optionally wherein the one or more first acoustic signals are configured to transfer the sample or a portion thereof to the mass spectrometry apparatus.

In some forms, the mass spectrometry data are generated using electrospray ionization, atmospheric pressure ionization, atmospheric pressure chemical ionization, atmospheric matrix-assisted laser desorption/ionization, wherein said viscosity may be determined concurrently with said mass spectrometry data.

In some forms, an analytical device to perform an analysis on the sample, optionally wherein the one or more first acoustic signals transfer the sample to the analytical device from the first and/or second location.

In some forms, the analytical device comprises a mass spectrometer, a liquid chromatography device, a spectrophotometric device, a glycan analysis device, an infrared detector, a fluorescence plate reader, or combinations thereof.

In some forms, the acoustic liquid handler is configured to determine whether the sample is within specification or defective based on the measured viscosity of the sample. A specification refers to one or more specified parameters indicating the acceptability of the sample when the characteristics of the sample (e.g., viscosity) fall within the specified parameters. If the characteristics of the sample do not fall within the specified parameters, the sample may be considered defective.

In some forms, the method and/or acoustic liquid handler may be performed on at least 100 additional samples within two hours.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

Figure 1:
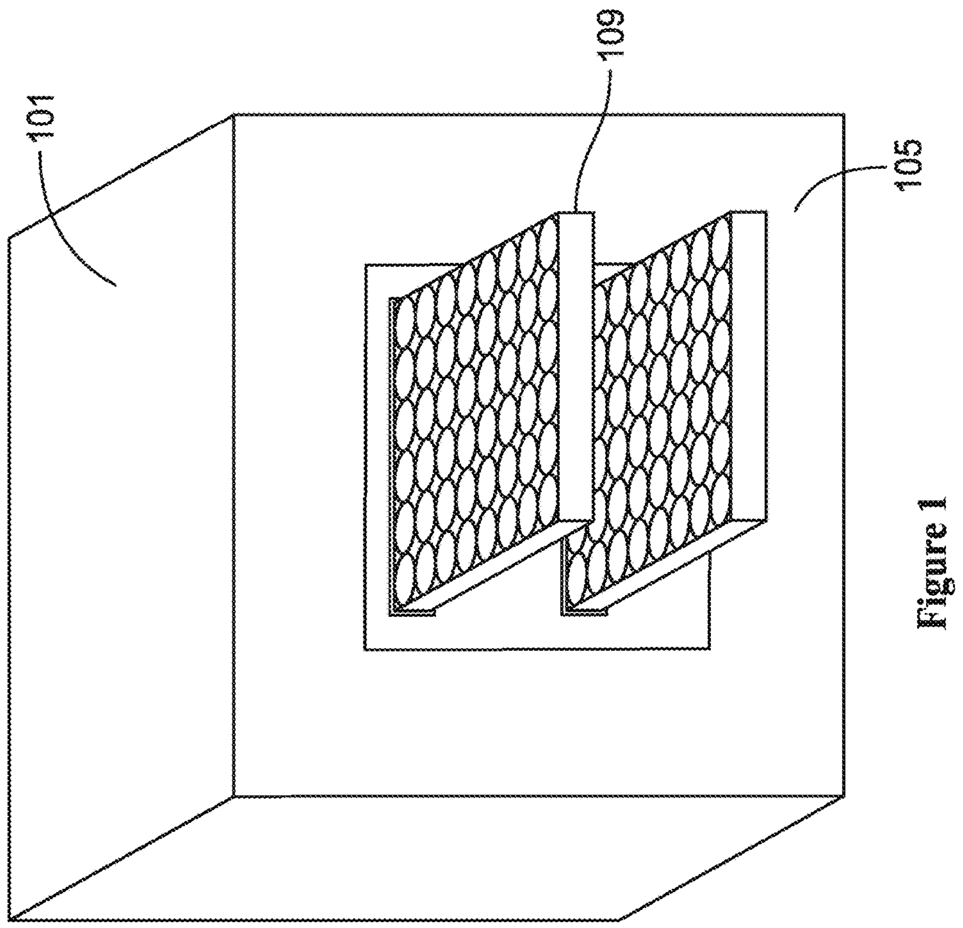
FIG. 1 depicts one example of an acoustic liquid handler configured to determine a viscosity of a liquid sample constructed in accordance with the principles of the present disclosure.

As discussed above, it may be necessary to measure the viscosity of liquid samples comprising protein. Because very small amounts (e.g., volumes) of liquid samples (in some instances, as little as 10 μL) are often of interest in research, it may be necessary to measure the viscosity of those very small amounts of liquid samples of protein. Conventional viscosity measurement techniques, however, present disadvantages, for example in terms of throughput, speed, and sample consumption.

For example, the conventional cone and plate viscosity measurement method discussed above typically requires 80 μL of a liquid sample to produce an accurate viscosity measurement. Therefore, when less than 80 μL of the liquid sample is available, the cone and plate method may be inoperable or inaccurate for measuring the viscosity of the liquid sample. The cone and plate method is also a destructive measurement method in that the liquid sample is typically difficult or impossible to recover after the completion of the viscosity measurement. This is because the cone and plate method measurement process comprises spinning the liquid sample with a rotating cone while tracking rotational shear stress and shear rates to determine viscosity. The result of the rotation of the cone is that the liquid sample is spun into a puddle on the plate with a high surface-area-to-volume ratio. Some of the liquid sample may spin off the plate and into other areas or components of the cone and plate testing machine. And even if the liquid sample can be recovered, it is likely that the fidelity of the liquid sample will be affected (for example, by contamination and/or damage to the sample) and the recovered liquid sample will be unsuitable for use in future research. Thus, even when more than 80 μL of the liquid sample is available, the destructive nature of the cone and plate method may destroy all of, or a substantial portion of, the liquid sample in the measurement process. The destruction of all of, or a substantial portion of, the liquid sample consumes limited resources, and inhibits the repeatability of the research. Another problem is that the conventional cone and plate method is a manual method. Thus while the cone and plate method can provide measurements with a high degree of accuracy, this only happens when performed under ideal operation. If the operator does not utilize proper techniques when performing the cone and plate method, the measured viscosity of the liquid sample can be skewed, presenting challenges in assay-to-assay comparisons.

Other methods of viscosity measurement of small liquid samples present problems as well. For example, the Rheosense Initium method has not demonstrated high accuracy and precision for highly viscous liquid samples, requires an approximate range of viscosity to be known prior to the measurement to function as intended, and does not take into account shear rates. As another example, the Malvern Viscosizer method also uses glycerol standards and also does not take into account shear rates. Moreover, the Rheosense Initium instrument and the Malvern Viscosizer instrument each are serial instruments (which run one sample at a time), and are subject to capillary clogging, which can entail enhanced cleaning and drying procedures (it is noted that residual liquid in the capillaries of these instruments can dilute a sample and skew viscosity readings). The enhanced cleaning and drying procedures can lead to run times of over one hour per sample.

The present disclosure aims to reduce these problems by providing a highly accurate and precise method and system for determining the viscosity of a liquid sample of a protein using an acoustic liquid handler that moves the liquid sample from a first location to a second location. The method and system non-destructively determine viscosity of smaller amounts of the liquid sample than measurable by conventional methods such as the cone and plate method. In fact, the disclosed method and system may be used to accurately determine the viscosity of a liquid sample with as little as 10

μL of the liquid sample. Moreover, because the disclosed method and system are non-destructive, the liquid sample may be recovered from the second location without affecting the fidelity of the liquid sample. Therefore, the liquid sample may be reused, maintaining the repeatability of the research and conserving resources. For example, after the determination of viscosity, the liquid sample may be used for additional analysis such as for additional analytics such as, but not limited to high throughput dynamic light scattering viscosity (See He, F.; Becker, G. W.; Litowski, J. R.; Narhi, L. O.; Brems, D. N.; Razinkov, V. I., High-throughput dynamic light scattering method for measuring viscosity of concentrated protein solutions. *Anal Biochem* 2010, 399 (1), 141-3), and colloidal stability measurements (See He, F.; Woods, C. E.; Becker, G. W.; Narhi, L. O.; Razinkov, V. I., High-throughput assessment of thermal and colloidal stability parameters for monoclonal antibody formulations. *J Pharm Sci* 2011, 100 (12), 5126-41), biotherapeutic high molecular weight analysis by size exclusion chromatography (See Hong, P.; Koza, S.; Bouvier, E. S., Size-Exclusion Chromatography for the Analysis of Protein Biotherapeutics and their Aggregates. *J Liq Chromatogr Relat Technol* 2012, 35 (20), 2923-2950) and high throughput mass spectrometric analytics (See Campuzano, I. D.; San Miguel, T.; Rowe, T.; Onea, D.; Cee, V. J.; Arvedson, T.; McCarter, J. D., High-Throughput Mass Spectrometric Analysis of Covalent Protein-Inhibitor Adducts for the Discovery of Irreversible Inhibitors: A Complete Workflow. *J Biomol Screen* 2016, 21 (2), 136-44). The disclosed method and system is also substantially, if not entirely, automated such that performance is not dependent on operator technique. The automated method and system are also significantly faster than the cone and plate method, producing results on the timescale of seconds per liquid sample rather than minutes per liquid sample (as required for the cone and plate method).

FIG. 1 illustrates one example of a system 100 for determining a viscosity of a liquid sample of a protein constructed in accordance with the teachings of the present disclosure. As illustrated in FIG. 1, the system 100 includes an acoustic liquid handler 101 having a first location 105 adapted to receive the liquid sample and a second location 109 adapted to receive the liquid sample from the first location 105. As will be discussed in greater detail below, the acoustic liquid handler 101 is configured to apply one or more first acoustic signals to the liquid sample in the first location 105 until a specified amount of the sample has been transferred from the first location 105 to the second location 109. The system 100 is in turn configured to determine the viscosity of the sample based on a number of the one or more first acoustic signals required to transfer the specified amount of the sample from the first location 105 to the second location 109.

The acoustic liquid handler 101 illustrated in FIG. 1 is a standalone scientific instrument such as the Echo 550 Acoustic Liquid Handler manufactured by Labcyte or the ATS-100 instrument manufactured by EDC Biosystems, though in other examples, the acoustic liquid handler 101 may be incorporated into a broader scientific instrument. The acoustic liquid handler 101 generally uses the ADE process of applying ultrasonic pulses to eject droplets of the liquid sample, allowing for contactless and highly-precise transfer of small amounts of the liquid sample from the first location 105 to the second location 109. The acoustic liquid handler 101 may be used to transfer small amounts (e.g., small volumes) of the liquid sample that are in the range of, for example, milliliters, microliters, nanoliters, picoliters, or other small volumes or amounts of the liquid sample. While in this example the acoustic liquid handler 101 is used in connection with samples of proteins such as therapeutic proteins, the acoustic liquid handler 101 may instead be used to determine the viscosity of samples of nucleic acids (such as DNA and/or RNA), surfactants, serums, cell cultures, or other liquid samples of interest. Examples of therapeutic proteins include an antibody (such as a monoclonal antibody), an antigen-binding antibody fragment, an antibody protein product, a hormone, a growth factor, a cytokine, a cell-surface receptor or a ligand thereof, a fusion protein, a chimeric protein, a PEGylated protein, a peptide, a protein fragment or a conjugate comprising a protein (for example an antibody-drug conjugate or antibody-nucleic acid conjugate). Antibody protein products include those based on the full antibody structure and those that mimic antibody fragments which retain full antigen-binding capacity, e.g., scFvs, Fabs and VHHNH. Examples of antibody protein products include, without limitation a single chain antibody (SCA); a nanobody; a bispecific T cell engager molecule; a diabody; a triabody; a tetrabody; and multispecific antibodies (such as bispecific antibodies or trispecific antibodies). In some embodiments, the antibody protein product comprises or consists of a bispecific T cell engager (BITE®) molecule. BiTE® molecules refer to engineered bispecific antibody protein product formats See Huehls et al, *Immunol Cell Biol* 93(3): 290-296 (2015). They comprise the fusion of two single-chain variable fragments (scFvs) of different antibodies, or amino acid sequences from four different genes, on a single peptide chain, typically of about 55 kilodaltons. One of the scFvs binds to T cells via the CD3 receptor, and the other to a tumor cell via a tumor specific molecule.

In this example, the first location 105 is a plate or tray having a plurality of wells that facilitate a high-throughput liquid transfer of the sample. More particularly, the first location 105 is a plate having 384 wells each configured to receive a portion of the sample. Alternatively, the plate may have 96 wells, 1536 wells, 6144 wells, or any other number of wells for high-throughput liquid transfer. In other examples, the first location 105 may be a single well. In yet other examples, the plate of the first location 105 may be replaced by any one of one or more jars, beakers, troughs, pens, flasks, test tubes, cylinders, burettes, microfluidic or nanofluidic array, or any other suitable receptacles for holding the liquid sample. In this example, the plate that defines the first location 105 is removable from the acoustic liquid handler 101 to allow for convenient dispensing of the liquid sample into the well or wells of the first location 105. The plate can in turn be loaded into the acoustic liquid handler 101 in preparation for ADE operation of the acoustic liquid handler 101. In other examples, however, the plate (or other component defining the first location 105) can be an integral part of the acoustic liquid handler 101.

As also illustrated in FIG. 1, the second location 109 is inverted with respect to the first location 105 and positioned above the first location 105. The liquid samples transferred from the first location 105 into the second location may be held in the second location due to the surface tension of the liquid sample, or any other suitable method of holding the liquid sample in the second location such as the use of an electric field. In other examples, however, the second location 109 can be positioned differently relative to the first location 105.

Figure 2A:
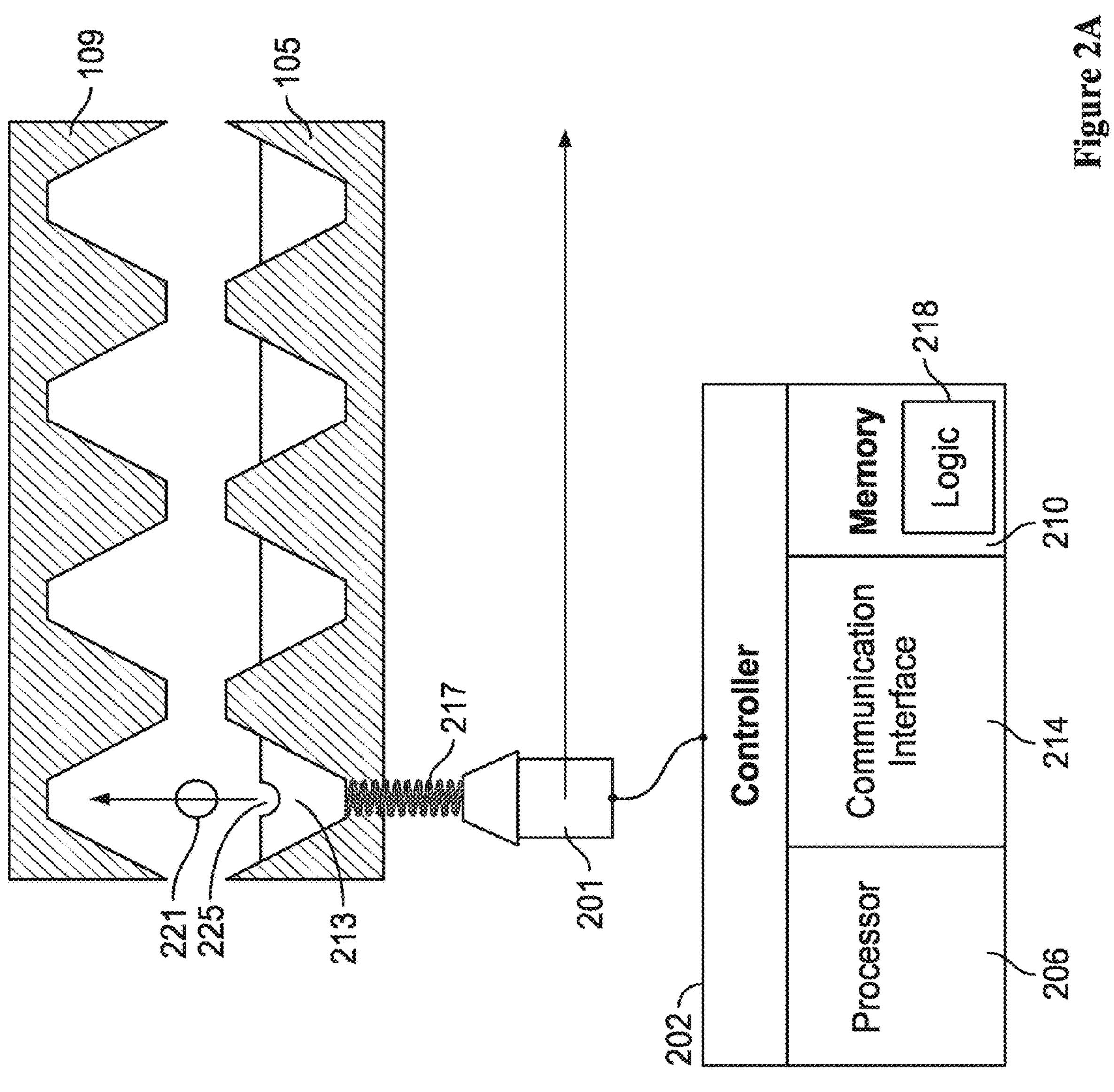
FIG. 2A is a cross-sectional view of a portion of the acoustic liquid handler of FIG. 1, showing a first location containing the liquid sample and an acoustic signal emitter ejecting a droplet into a second location.
Figure 2B:
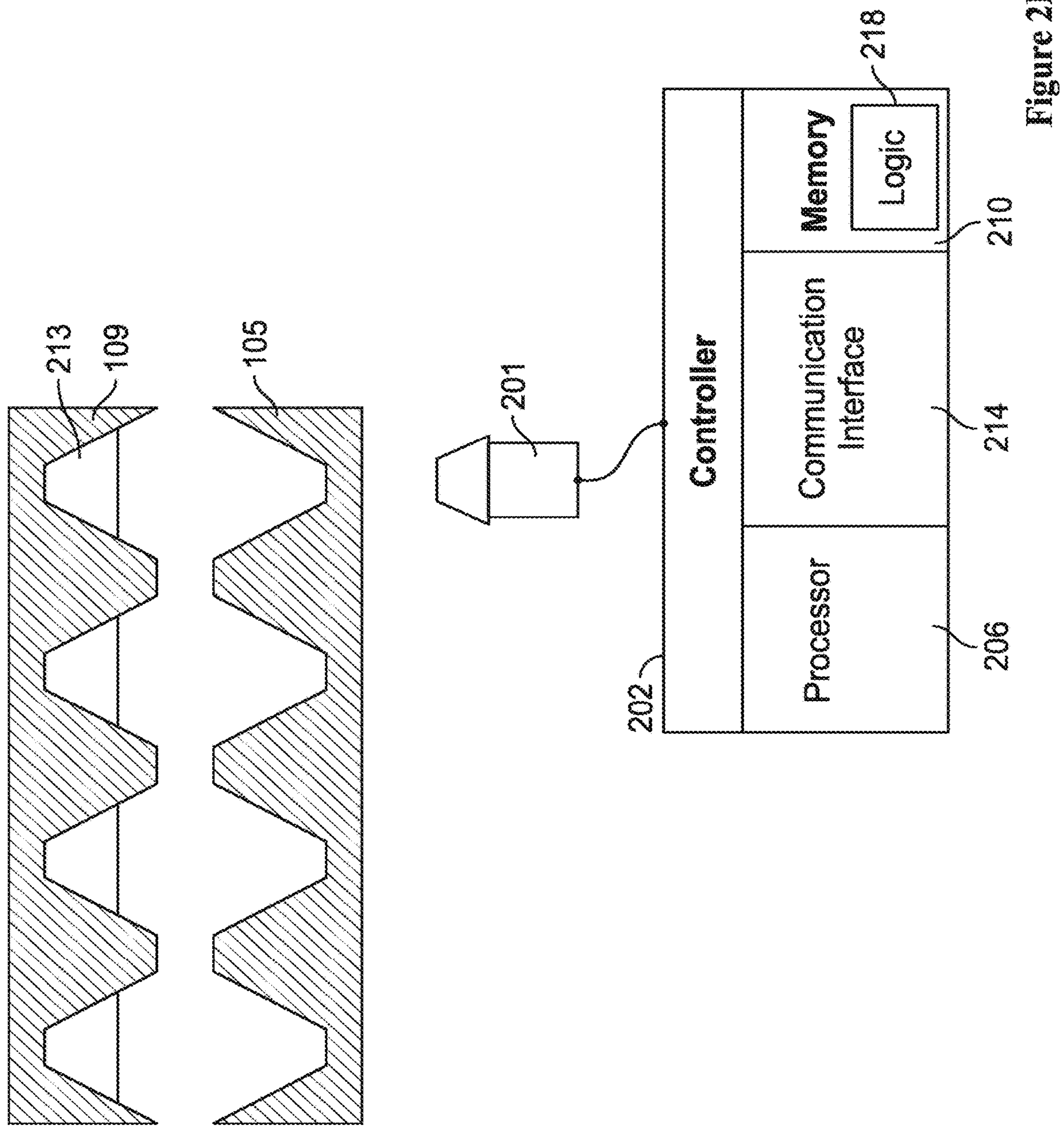
FIG. 2B is similar to FIG. 2A but shows the liquid sample once completely ejected into the second location from the first location via the acoustic signal emitter.

Reference is now made to FIG. 2A and FIG. 2B, which depict an interior portion of the acoustic liquid handler 101 as well as an acoustic signal emitter 201 and a controller 202 for determining the viscosity of a liquid sample 213 of protein in the first location 105. As discussed above, the amount of the liquid sample 213 needed to determine the viscosity using the system 100 is a small volume. For example, the volume of the liquid sample 213 may, for example, be no more than 10, 20, 30, 40, 50, 70, 80, 90, or 100 μL of the sample, or some other suitable volume or other amount of the liquid sample 213.

Reference is now made to FIG. 2A and FIG. 2B, which depict an interior portion of the acoustic liquid handler 101 as well as an acoustic signal emitter 201 and a controller 202 for determining the viscosity of a liquid sample 213 comprising protein in the first location 105. It is noted that the depicted liquid sample 213 may comprise one or more samples, any of which may have the same or different viscosity than another sample. As discussed above, the amount of the liquid sample 213 needed to determine the viscosity using the system 100 is a small volume. For example, the volume of the liquid sample 213 may, for example, be no more than 10, 20, 30, 40, 50, 60, 70, 80, 90, or 100 μL of the sample, or some other suitable volume or other amount of the liquid sample 213.

The acoustic liquid handler 101 is configured to apply one or more first acoustic signals to the liquid sample in the first location 105 via the acoustic signal emitter 201. The acoustic signal emitter 201 focuses each of the first acoustic signals on the surface of the liquid sample in the wells of the plate of the first location 105, causing a mound (which may be referred to as a "displacement") to form on the surface of the liquid sample and a droplet to eject from the liquid sample in the first location 105 into a second location 109. The volume of the ejected droplet may be determined based on a set of parameters of the first acoustic signals. The parameters may include one or more of frequency, a power, an amplitude, a wavelength, a bandwidth, a period, or other parameters.

More specifically, as depicted in FIG. 2A, the acoustic signal emitter 201 applies one or more acoustic signals 217 to the liquid sample 213 contained in a leftmost well of the wells of the plate defining the first location 105, thereby producing a mound 225 and ejecting a droplet 221 upwards into a leftmost well of the wells of the plate defining the second location 109. It will be appreciated that the other wells of the first location 105 contain additional samples from the liquid sample 213, any of which may comprise more of the same sample (for example, to run a sample in duplicate, triplicate, etc.), and/or a different sample (for example, comprising a different protein, concentration, and/or formulation ingredients). The acoustic signal emitter 201 is depicted with a rightward arrow to indicate that after the specified amount of the liquid sample 213 has been ejected from the leftmost well of the wells of the first location 105 and into the leftmost well of the wells of the second location 109, the acoustic signal emitter 201 will move rightward to similarly apply one or more acoustic signals 217 to each liquid sample contained in each respective well of the other wells of the first location 105. While FIG. 2A only depicts a single row of wells for each of the first location 105 and second location 109, it is worth noting that there can be multiple rows laid out over a grid, or some other arrangement, as shown in the depiction of the first location 105 and the second location 109 in FIG. 1.

In this example, the controller 202 is located remotely from but communicatively connected to the acoustic liquid handler 101. In other examples, however, the controller 202 may be part of or located proximate to the acoustic liquid handler 101. As illustrated in FIG. 2A, the controller 202 generally includes a processor 206, a memory 210, a communications interface 214, and computing logic 218. One of ordinary skill in the art will appreciate that the controller 202 can also include additional components, such as, for example, analog-digital converters, digital-analog converters, amplifiers, sensors, and gauges, which are not explicitly depicted herein. Optionally, the controller 202 is calibrated based on a predetermined relationship between viscosity for a standard such as a known substance (e.g., cone-plate derived cP viscosity of the standard) and the number of first acoustic signals required to transfer a specified amount of the standard (e.g., iterations). The linear fit in FIGS. 3H-3J with R 2 values of 0.89-0.90 suggests that the controller 202 can be reliably calibrated based on the relationship between viscosity and the number of first acoustic signals, including for the determination of viscosity for samples of unknown viscosity and/or composition. The calibrated controller 202 may be used to determine the viscosity of one or more samples, including samples of unknown composition and/or viscosity. The calibrated controller 202 may determine the viscosity of the one or more samples without further calibration. In some examples, the calibration is based on a linear relationship between viscosity for a standard or known substance and the number of first acoustic signals required to transfer a specified amount of the standard or known substance. In some examples, the calibration is based on a determined mathematical relationship between viscosity for a standard or known substance and the number of first acoustic signals required to transfer a specified amount of the standard or known substance, which mathematical relationship may be linear or non-linear. In some examples, the calibration is based on a linear relationship between viscosity for a standard or known substance and any of (i) number of first acoustic signals required to transfer a specified amount of the standard or known substance, (ii) SubEject Power (dB) required to transfer a specified amount of the standard or known substance, (iii) SubEjectAmp (Volt) required to transfer a specified amount of the standard or known substance, (iv) New EjectAmp (Volt) required to transfer a specified amount of the standard or known substance, (v) New EjectAmp+ThreshdB (Volt) required to transfer a specified amount of the standard or known substance, or (vi) Power Difference (Volt) required to transfer a specified amount of the standard or known substance.

The processor 206 may be a general processor, a digital signal processor, ASIC, field programmable gate array, graphics processing unit, analog circuit, digital circuit, or any other known or later developed processor. The processor 206 operates pursuant to instructions in the memory 210. The memory 210 may be a volatile memory or a non-volatile memory. The memory 210 may include one or more of a read-only memory (ROM), random-access memory (RAM), a flash memory, an electronic erasable program read-only memory (EEPROM), or other type of memory. The memory 210 may include an optical, magnetic (hard drive), or any other form of data storage device.

The communications interface 214, which may be, for example, a HART® interface, a FOUNDATION™ fieldbus interface, a PROFIBUS® interface, or some other port or interface, is provided to enable or facilitate electronic communication between the acoustic liquid handler 101 (e.g., the acoustic signal emitter 201) and the controller 202 and between any other components of the system 100. This electronic communication may occur via any known communication protocol, such as, for example, the HART® communication protocol, the FOUNDATION™ fieldbus communication protocol, the PROFIBUS® communication protocol, or any other suitable communication protocol.

The logic 218 includes one or more routines and/or one or more sub-routines, embodied as computer-readable instructions stored on the memory 210. The controller 202, particularly the processor 206 thereof, can execute the logic 218 to cause the processor 206 to perform actions related to the operation (e.g., control, adjustment), maintenance, diagnosis, and/or troubleshooting of the acoustic liquid handler 101 and any components interior to the acoustic liquid handler 101 (e.g., the acoustic signal emitter 201), as will be described in greater detail below.

More particularly, the controller 202 is generally configured to control the operation of the acoustic signal emitter 201. In particular, the controller 202 is configured to provide instructions to the acoustic signal emitter 201 to (i) emit one or more acoustic signals 217 of a set of parameters towards a first well in the first location 105 until the specified amount of the liquid sample 213 in that first well is transferred to the second location 109, and (ii) move the acoustic signal emitter 201 such that it is positioned under a second well in the first location 105. The controller 202 provides instructions to repeat these two steps until a specified set of conditions are met. These conditions may be that a specified number of wells of the first location 105 have had a specified amount of the liquid sample transferred to the corresponding wells of the second location 109. The controller 202 may be configured to provide instructions to the acoustic signal emitter 201 to emit the one or more acoustic signals 217 iteratively, varying the specified set of parameters until the specified amount of the liquid sample 213 is transferred. These parameters may include one or more of frequency, a power, an amplitude, a wavelength, a bandwidth, a period, or other parameters.

In some examples, the controller 202 may also be configured to determine when the specified amount of the liquid sample 213 has been transferred from the first location 105 to the second location 109. In one example, the controller 202 may be configured to directly or indirectly measure an amount of the liquid sample 213 transferred from the first location 105 to the second location 109 using a fluid measurement technique. For example, volume loss in the first location 105 (such as volume loss in a well) can be measured to calculate the amount of liquid sample 213 transferred. For example, fluid displacement per ping can be measured, and multiplied by the number of pings. For example, droplet volume can be calculated based on one or more parameters as described herein. The amount of fluid transferred can be calculated from the number of droplets transferred. By way of example, from droplet diameter, may be determined from a diameter of a beam of acoustic signal 217. By way of example, droplet diameter and/or volume may be determined optically. The controller may further determine if the amount of the liquid sample 213 transferred is the specified amount of the liquid sample 213 to be transferred. The controller may determine whether the specified amount of the liquid sample 213 has been transferred by (i) commanding the acoustic signal emitter 201 to apply one or more second acoustic signals to a first portion of the liquid sample 213 not transferred from the first location, (ii) determining an amount of the first portion of the liquid sample 213 not transferred based on the application of the second acoustic signals, and (iii) determining an amount of a second portion of the liquid sample 213 transferred based on the determination of the amount of the first portion of the liquid sample 213 not transferred. After determining the amount of the liquid sample 213 transferred, the controller 202 may compare the amount of the second portion and/or first portion of the sample to the specified amount of the liquid sample 213 to be transferred. If the specified amount of the liquid sample 213 has been transferred, the controller may command the acoustic signal emitter 201 to stop applying acoustic signals 217 to the current well and move to a different well.

In one example, the specified amount of the liquid sample 213 to be transferred may be all of the liquid sample 213. In another example, the specified amount of the liquid sample 213 to be transferred may be a majority, a substantial portion (but not all), or some other portion of the liquid sample 213. As used herein, a "substantial portion" of the liquid sample refers to a volume for which the number of iterations of acoustic signal required to move that volume is reproducible. If additional numerical detail is of interest, a substantial portion may refer to at least 20%, 30%, 40%, or 50% of the sample. As used herein, "substantially all" refers to a portion of the liquid sample for which the remaining amount of liquid sample is a volume insufficient to be moved by a reproducible number of iterations of acoustic signal. If additional numerical detail is of interest, substantially all of the liquid sample may refer to at least 80%, 90%, 95%, 97%, or 99% of the sample. In another example, the specified amount of the sample to be transferred is an amount sufficient to create a displacement along one or more axes on a meniscus of a portion of the liquid sample 213 remaining in the first location 105. This displacement may be referred to as a mound, for example, the mound 225 depicted in FIG. 2A, which is formed when the acoustic energy focused on the liquid sample 213 in the first location 105 overcomes a threshold of ejection determined by the surface tension of the liquid sample 213, causing ejection of a droplet, e.g., the droplet 221, due to Rayleigh-Taylor instability, as discussed above in the background section.

The controller 202 may iteratively vary the parameters of the acoustic signals 217 until the specified amount of the liquid sample 213 has been transferred. The controller 202 may, for example, adjust the frequency of the acoustic signals 217, iteratively increasing the frequency by no more than 0.1 Hz, or by no more than 0.05 Hz per iteration. In some examples, the applied acoustic signals 217 may have a frequency in the range of 1 mHz to 5 mHz, such as 1 to 4 mHZ or 1.5 to 3 mHz. In other examples, depending on equipment used and intended use, the frequency range may be significantly wider than the range of 1 mHz to 5 mHz. The controller 202 may alternatively or additionally adjust other acoustic signal parameters, including a power, an amplitude, a wavelength, a bandwidth, a period, or combinations thereof. Power can be measured either directly in decibels of the output acoustic signals 217, or indirectly, for example, by measuring a voltage applied to a transducer of the acoustic signal emitter 201. In some examples, the power of the acoustic signals 217 may be in the range of 0.5 dB to 2.5 dB, such as 1-2 dB or 1-1.5 dB. In other examples, depending on equipment used and intended use, the power range may be significantly wider than the range of 0.5 dB to 2.5 dB.

When the specified amount of the liquid sample 213 has been transferred, e.g., as illustrated in FIG. 2B, which depicts all of the liquid sample 213 being transferred from the first location 105 to the second location 109, the controller 202 is further configured to determine the viscosity of the liquid sample 213 based on a number (or quantity) of the acoustic signals 217 applied by the acoustic signal emitter 201 that are required to transfer the specified amount of the liquid sample 213 from the first location 105 to the second location 109. For example, the controller 202 may determine that a first sample of the liquid sample 213 has a first viscosity when fifty acoustic signals 217 are required to transfer the specified amount of the liquid sample 213 from the first location 105 to the second location 109, but that a second sample of the liquid sample 213 has a second viscosity, higher than the first viscosity, when one-hundred acoustic signals 217 are required to transfer the specified amount of the liquid sample 213 from the first location 105 to the second location 109. The Applicant has discovered that there is a correlation between the viscosity of the liquid sample 213 and the number of the acoustic signals 217 required to transfer the specified amount of the liquid sample 213 from the first location 105 to the second location 109. This correlation may be a 1:1 correlation, a 2:1 correlation, or some other correlation. In any event, the controller 202 may execute the logic 218 to cause the processor 206 to determine the viscosity of the sample 213 by comparing the number of the acoustic signals 217 applied to a predetermined relationship, stored in the memory 210, between the number of the acoustic signals applied and the viscosity. The stored predetermined relationship may be for one or more parameters as described herein.

In some examples, controller 202 may determine the viscosity of the liquid sample 213 based on the number of the acoustic signals 217 required to transfer the specified amount and other factors or data. As an example, the viscosity determination may further be based on one or more parameters of the acoustic signals 217, e.g., based on the frequency (or frequencies) of the applied acoustic signals 217. Further yet, in some examples, when the controller 202 makes a viscosity determination, the controller 202 may update the predetermined relationship stored in the memory 210 to include that viscosity determination (by, for example, updating the predetermined relationship based on the number of the acoustic signals 217 required to transfer the specified amount and any other known factors or data). That is, the predetermined relationship may be further refined based on further empirical data.

In some examples, once the viscosity has been determined for a portion of the liquid sample 213 or the entire liquid sample 213, the controller 202 may make a determination on whether the measured viscosity is acceptable (e.g., for facilitating analysis of the liquid sample 213). The measured viscosity may be determined to be acceptable if it is within a range of predetermined values, equal to a predetermined value within a predetermined tolerance, less than a predetermined threshold, greater than a predetermined threshold, or in agreement with some other suitable standard. For example, the controller 202 may be calibrated based on a determined relationship between viscosity for a standard or known substance (e.g. cone-plate derived cP) and the number of first acoustic signals required to transfer the specified amount of the standard or known substance. For example, the controller 202 may be calibrated based on a determined relationship between viscosity for a standard or known substance and any of (i) number of first acoustic signals required to transfer the specified amount of the standard or known substance, (ii) SubEject Power (dB) required to transfer the specified amount of the standard or known substance, (iii) SubEjectAmp (Volt) required to transfer the specified amount of the standard or known substance, (iv) New EjectAmp (Volt) required to transfer the specified amount of the standard or known substance, (v) New EjectAmp+ThreshdB (Volt) required to transfer the specified amount of the standard or known substance, or (vi) Power Difference (Volt) required to transfer the specified amount of the standard or known substance. By way of example, the determined relationship may be a linear relationship, though some non-linear mathematical relationships may also be suitable. The calibrated controller 202 may determine the viscosity of one or more samples of unknown composition and/or viscosity. The calibrated controller may determine the viscosity of the one or more samples without further calibration. The measured viscosity may also be determined to be acceptable if it is measured to be a viscosity that will not prevent or hinder the successful operation of high-performance liquid chromatography (HPLC) or ultra-performance liquid chromatography (UPLC) as applied to the portion of the liquid sample. If the portion of the liquid sample 213 or the entire liquid sample 213 is determined to not be acceptable, the portion of the liquid sample 213 or the entire liquid sample 213 may be discarded, or the sample 213 may be diluted to bring the viscosity to an acceptable level for the HPLC or UPLC. The maximum viscosity tolerated by instruments such as HPLC and UPLC instruments can depend on several factors, including how much the sample is diluted during and after injection, injection needle and tubing diameter, as well as autosampler and system temperature. Accordingly, a predetermined threshold can be set at the maximum viscosity that will be tolerated by a particular instrument such as an HPLC or UPLC instrument. If a system or method as described herein ascertains that a sample 213 has a viscosity that exceeds the predetermined threshold (i.e., if the sample 213 is determined to be too viscous), the sample 213 can be not injected into the instrument, or the sample 213 can be diluted to bring the viscosity to a permissible level for that instrument. For example, a predetermined threshold may be that a liquid sample 213 has an acceptable viscosity to be used with HPLC or UPLC if the viscosity is determined to be less than 500 cP. In such an example, if the controller 202 determines that the liquid sample 213 has a viscosity of 600 cP, the liquid sample may be discarded or diluted to an acceptable viscosity.

Figures 3A, 3B:
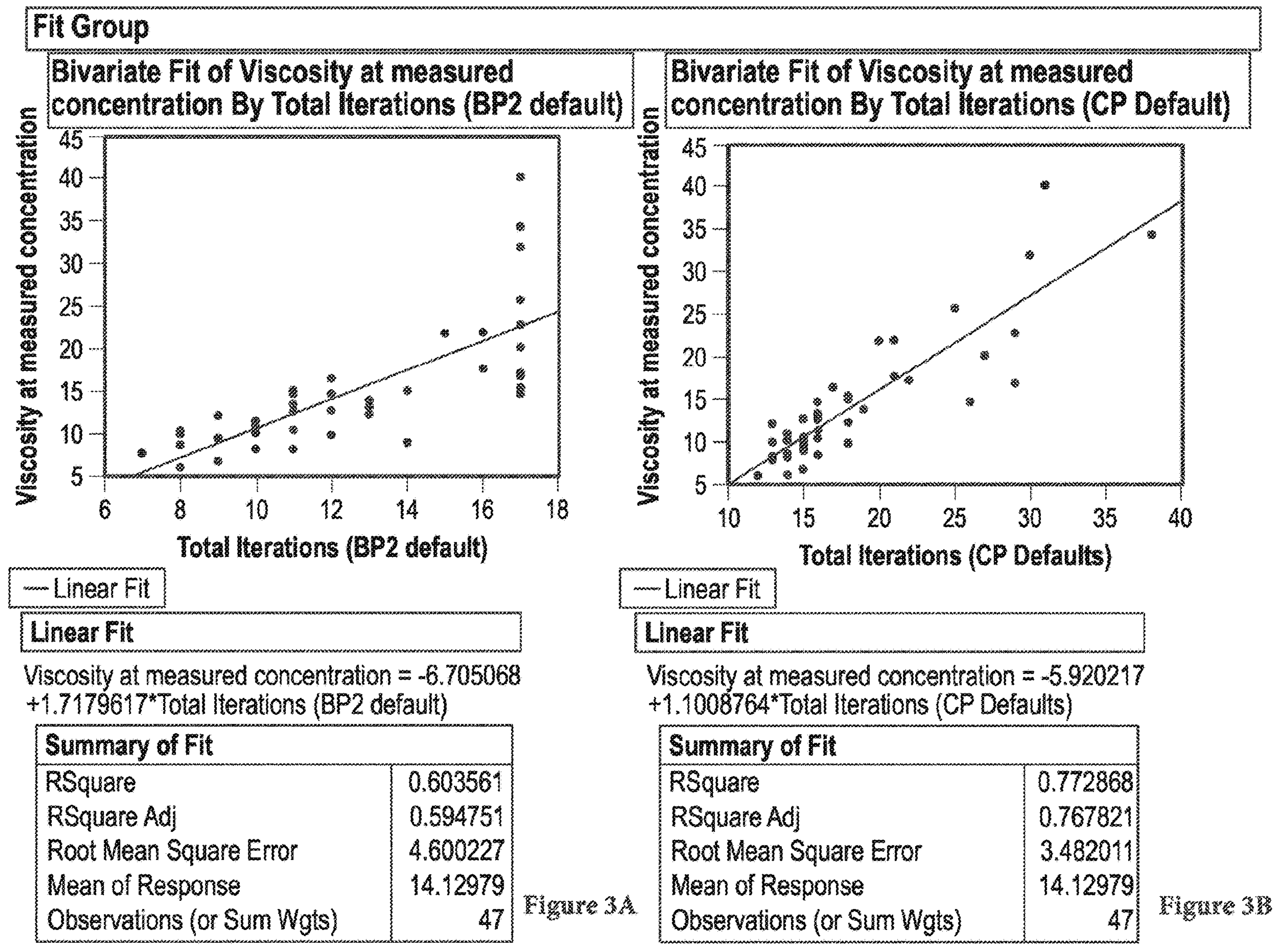
FIG. 3A depicts a graph demonstrating the correlation between the cone and plate method and the method of the present disclosure when used to determine the viscosity of a liquid sample of a concentration in the range of 100-165 mg/mL using acoustic signals having a first power setting and a stepwise increase in acoustic signal frequency between iterations.
FIG. 3B depicts a graph demonstrating the correlation between the cone and plate method and the method of the present disclosure when used to determine the viscosity of the liquid sample of the concentration in the range of 100-165 mg/mL using acoustic signals having a second power setting and a stepwise increase in acoustic signal frequency between iterations.
Figures 3C, 3D:
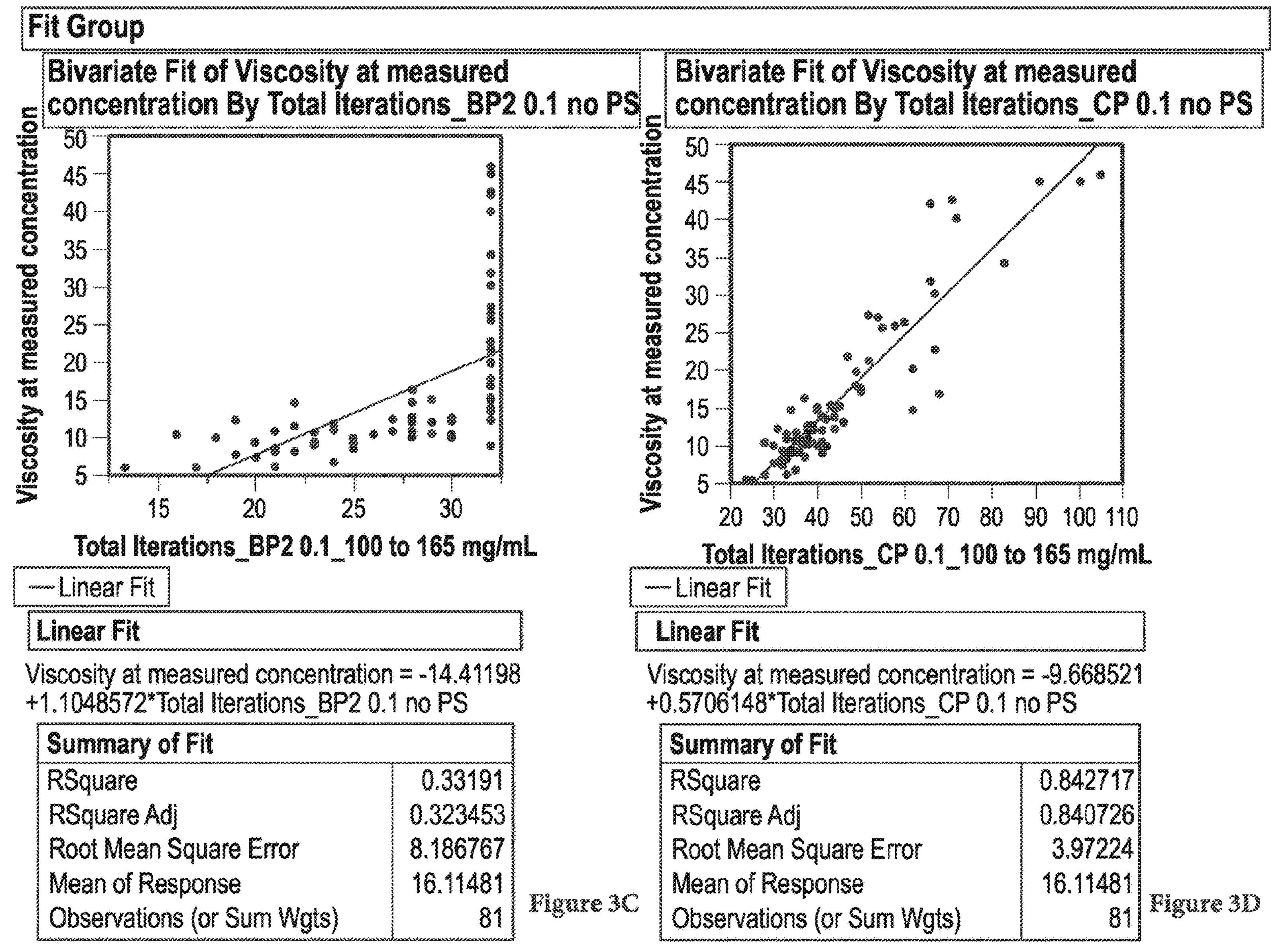
FIG. 3C depicts a graph demonstrating the correlation between the cone and plate method and the method of the present disclosure when used to determine the viscosity of the liquid sample of the concentration in the range of 100-165 mg/mL using acoustic signals having the first power setting and a step-wise frequency increase decreased to 0.1 Hz between iterations.
FIG. 3D depicts a graph demonstrating the correlation between the cone and plate method and the method of the present disclosure when used to determine the viscosity of the liquid sample of the concentration in the range of 100-165 mg/mL using acoustic signals having the second power setting and a step-wise frequency increase decreased to 0.1 Hz between iterations.
Figures 3E, 3F:
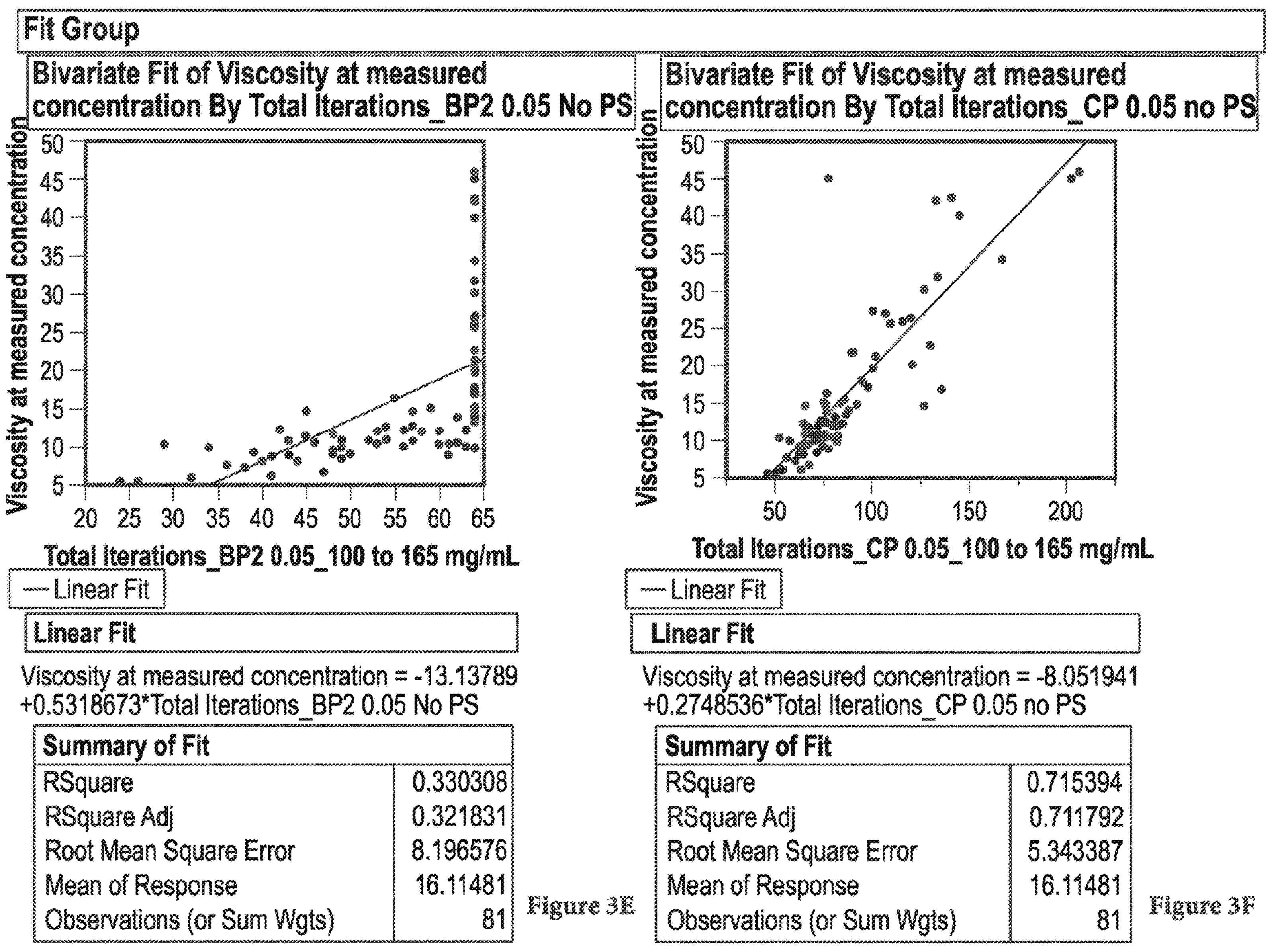
FIG. 3E depicts a graph demonstrating the correlation between the cone and plate method and the method of the present disclosure when used to determine the viscosity of the liquid sample of the concentration in the range of 100-165 mg/mL using acoustic signals having the first power setting and a step-wise frequency increase decreased to 0.05 Hz between iterations.
FIG. 3F depicts a graph demonstrating the correlation between the cone and plate method and the method of the present disclosure when used to determine the viscosity of the liquid sample of the concentration in the range of 100-165 mg/mL using acoustic signals having the second power setting and a step-wise frequency increase decreased to 0.05 Hz between iterations.
Figures 3G, 3H:
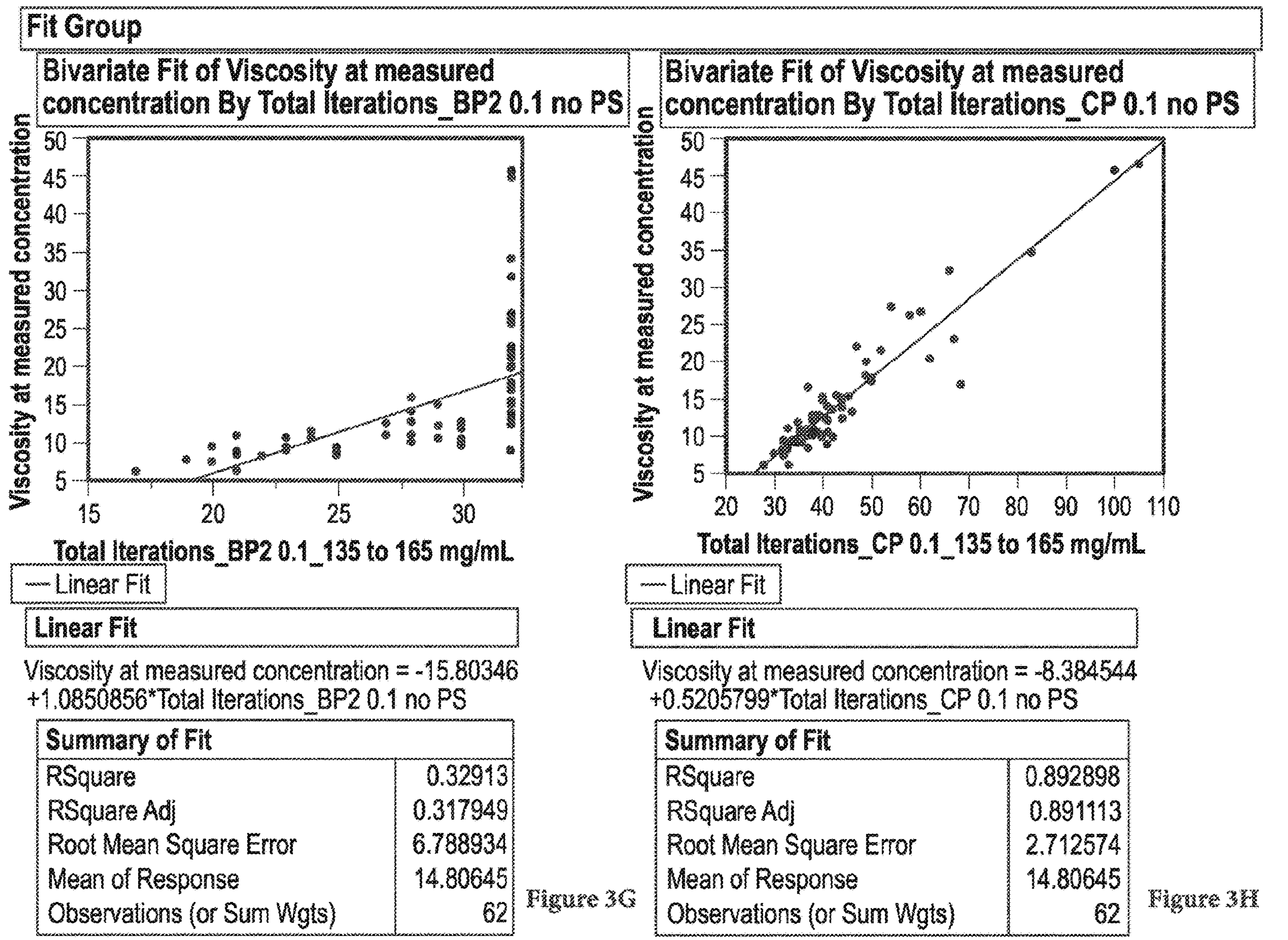
FIG. 3G depicts a graph demonstrating the correlation between the cone and plate method and the method of the present disclosure when used to determine the viscosity of the liquid sample of a concentration in the range of 135-165 mg/mL using acoustic signals having the first power setting and a step-wise frequency increase decreased to 0.1 Hz between iterations.
FIG. 3H depicts a graph demonstrating the correlation between the cone and plate method and the method of the present disclosure when used to determine the viscosity of the liquid sample of a concentration in the range of 135-165 mg/mL using acoustic signals having the second power setting and a step-wise frequency increase decreased to 0.1 Hz between iterations.
Figures 3I, 3J:
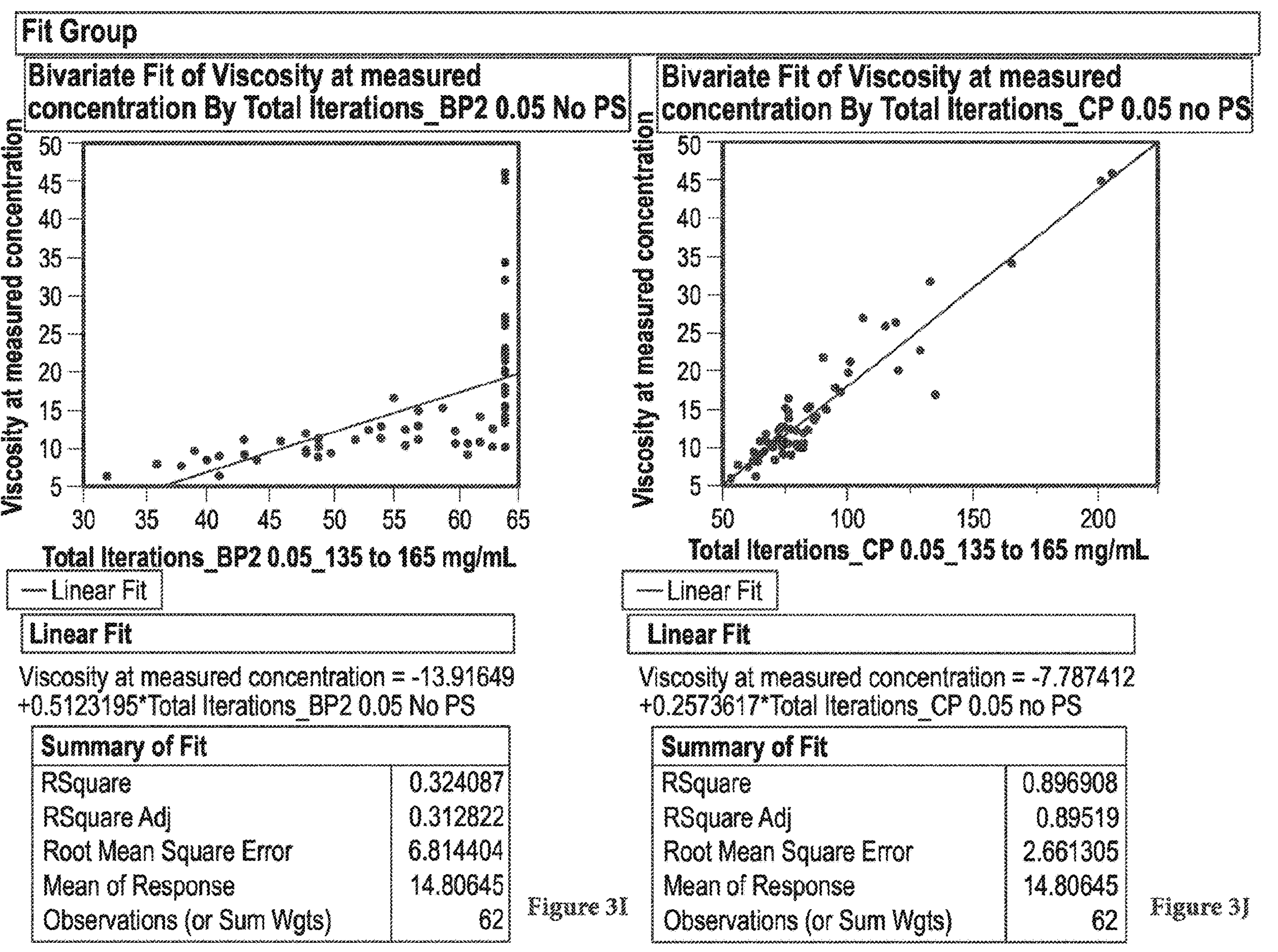
FIG. 3I depicts a graph demonstrating the correlation between the cone and plate method and the method of the present disclosure when used to determine the viscosity of the liquid sample of the concentration in the range of 135-165 mg/mL using acoustic signals having the first power setting and a step-wise frequency increase decreased to 0.05 Hz between iterations.
FIG. 3J depicts a graph demonstrating the correlation between the cone and plate method and the method of the present disclosure when used to determine the viscosity of the liquid sample of the concentration in the range of 135-165 mg/mL using acoustic signals having the second power setting and a step-wise frequency increase decreased to 0.05 Hz between iterations.

Further, the Applicant has verified that the method and system described herein effectively determines the viscosity of a liquid sample while also overcoming the problems associated with the cone and plate method and other conventional techniques. FIGS. 3A-3J illustrate the correlation between the viscosities measured by the cone and plate method and the viscosities determined by the method and system described herein for the liquid samples 213 as a function of total iterations. A linear regression calculated from the correlation coefficient ($R^2$) is shown. FIG. 3A depicts the correlation when the two are tested with liquid samples 213 of concentrations ranging from 100 to 165 mg/mL and with acoustic signals 217 having a first power setting and a stepwise increase in frequency across iterations according to the apparatus' default BP2 settings. It is noted that the default BP2 settings were configured with a greater step size per iteration than the adjusted settings in FIGS. 3C and 3G (0.1 Hz) and FIGS. 3E and 3I (0.05 Hz). It is further contemplated that a constant frequency across iterations, or a linear increase in frequency may also be suitable for some examples. It is also noted that instruments may have different power settings. For example, LabCyte's software for the Echo 550 Acoustic Liquid Handler has low, medium, and high power settings. FIG. 3B depicts the correlation when the two are tested with liquid samples 213 of concentrations ranging from 100 to 165 mg/mL and with acoustic signals 217 having a second power setting different from the first power setting and a stepwise increase in frequency between iterations according to the apparatus' default CP settings (the CP settings leverage dynamic fluid analysis). It is noted that the default CP settings were configured with a greater step size per iteration than the adjusted settings in FIGS. 3D and 3H (0.1 Hz) and FIGS. 3F and 3J (0.05 Hz). FIG. 3C depicts the correlation when the two are tested with liquid samples 213 of concentrations ranging from 100 to 165 mg/mL and with acoustic signals 217 having the first power setting and a step-wise increase in frequency of only 0.1 Hz between iterations. FIG. 3D depicts the correlation when the two are tested with liquid samples 213 of concentrations ranging from 100 to 165 mg/mL and with acoustic signals 217 having the second power setting and a step-wise frequency increase of only 0.1 Hz between iterations. FIG. 3E depicts the correlation when the two are tested with liquid samples 213 of concentrations ranging from 100 to 165 mg/mL and with acoustic signals 217 having the first power setting, and a step-wise frequency increase of only 0.05 Hz between iterations. As described herein, it has been observed that a relatively small size of the frequency increase between iterations can yield superior (stronger) correlation coefficients compared to larger stepwise frequency increases. It is noted that stepwise increases in the range of 0.05 to 0.1 Hz are relatively small increases. FIG. 3F depicts the correlation when the two are tested with liquid samples 213 of concentrations ranging from 100 to 165 mg/mL and with acoustic signals 217 having the second power setting and a smaller step-wise frequency increase of 0.05 Hz between iterations. FIG. 3G depicts the correlation when the two are tested with liquid samples 213 of concentrations ranging from 135 to 165 mg/mL and with acoustic signals 217 having the first power setting and a step-wise frequency increase of 0.1 Hz between iterations. FIG. 3H depicts the correlation when the two are tested with liquid samples 213 of concentrations ranging from 135 to 165 mg/mL and with acoustic signals 217 having the first power setting and a relatively small step-wise increase of Hz between iterations. FIG. 3I depicts the correlation when the two are tested with liquid samples 213 of concentrations ranging from 135 to 165 mg/mL and with acoustic signals 217 having the first power setting and a relatively smaller step-wise frequency increase of only 0.05 Hz between iterations. FIG. 3J depicts the correlation when the two are tested with liquid samples 213 of concentrations ranging from 135 to 165 mg/mL and with acoustic signals 217 having the second power setting and a relatively smaller step-wise frequency increase of only 0.05 Hz between iterations.

Figure 3K:
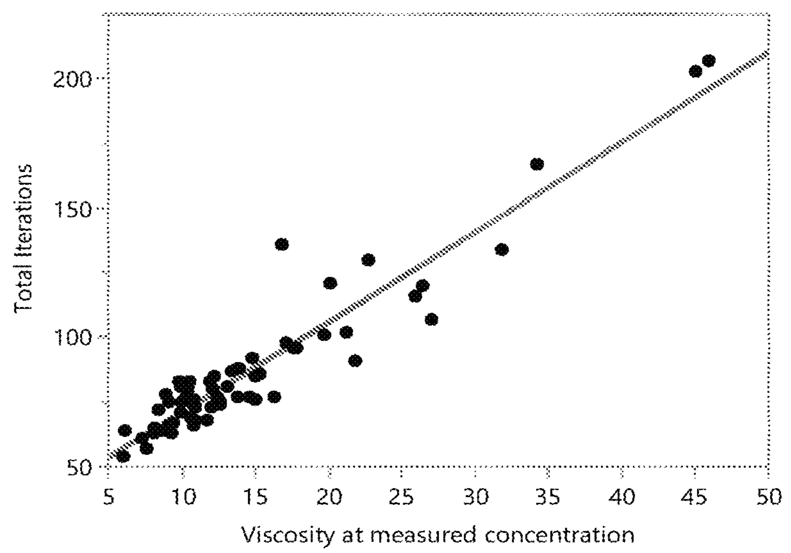
FIGS. 3K-3P are graphs demonstrating the correlation between the cone and plate method and the method of the present disclosure when used to determine the viscosity of the liquid sample of the concentration in the range of 135-165 mg/mL using acoustic signals having the second power setting and a step-wise frequency increase decreased to 0.05 Hz between iterations in CP mode.
Figure 3L:
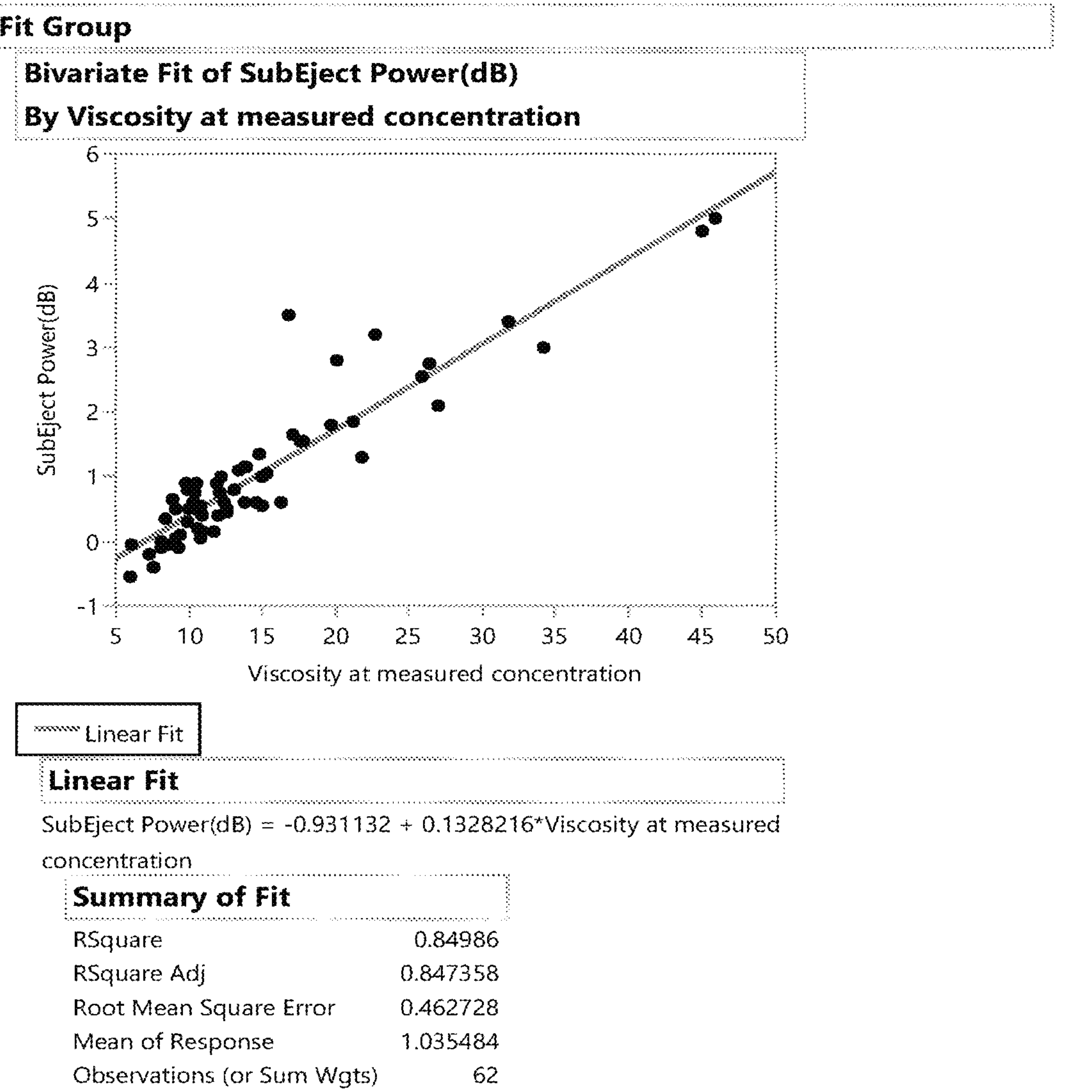
Figure 3M:
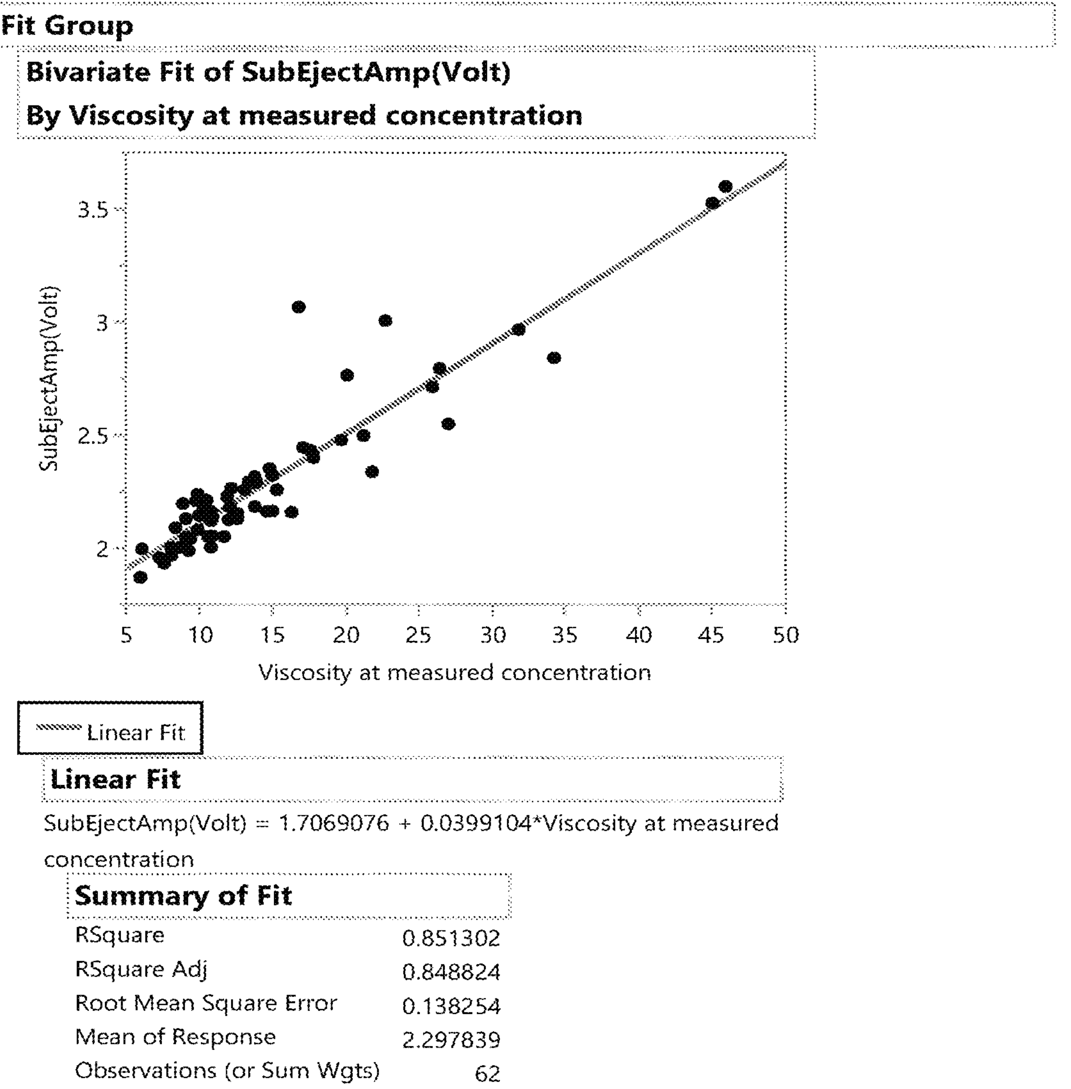
Figure 3N:
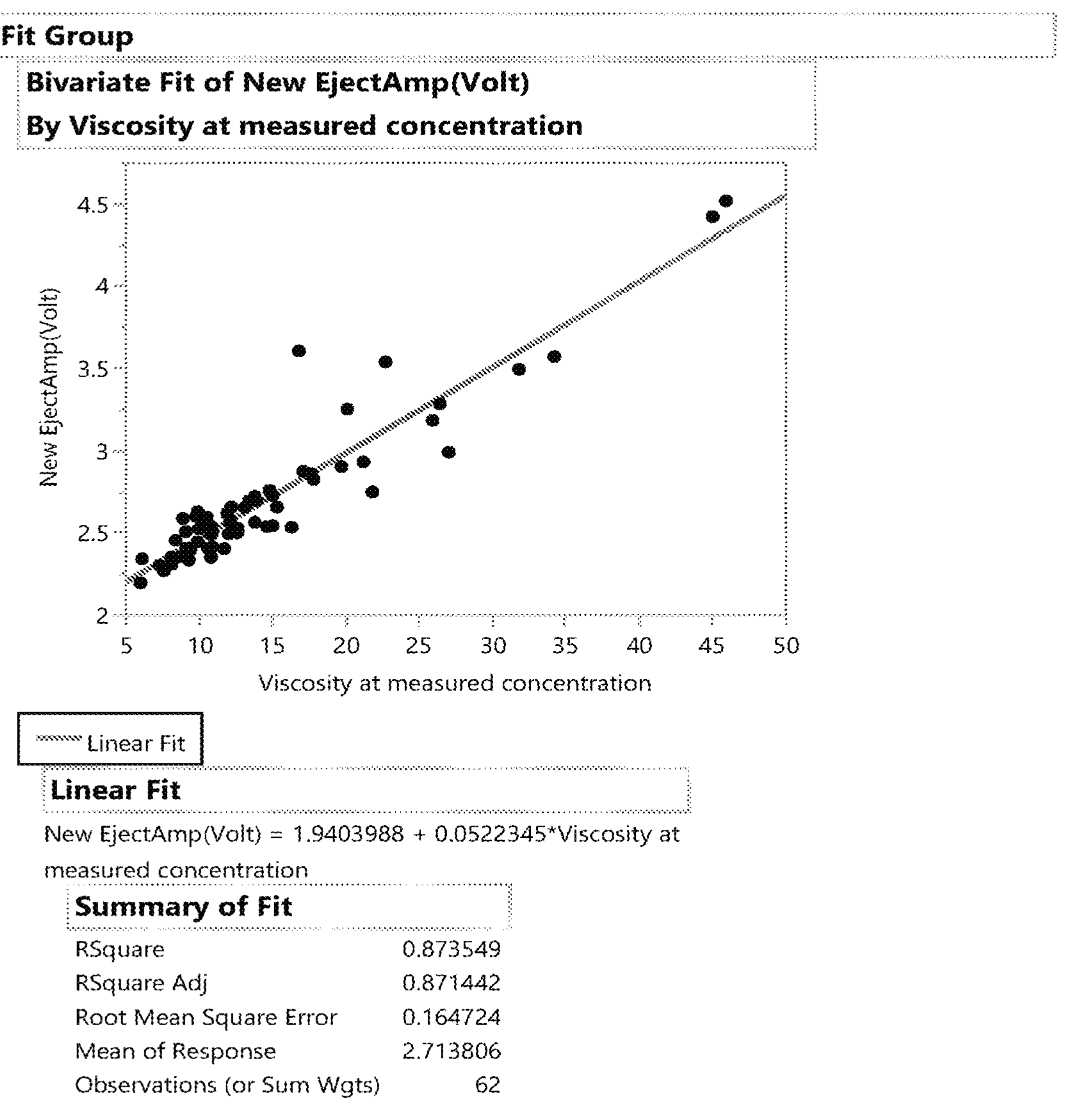
Figure 3O:
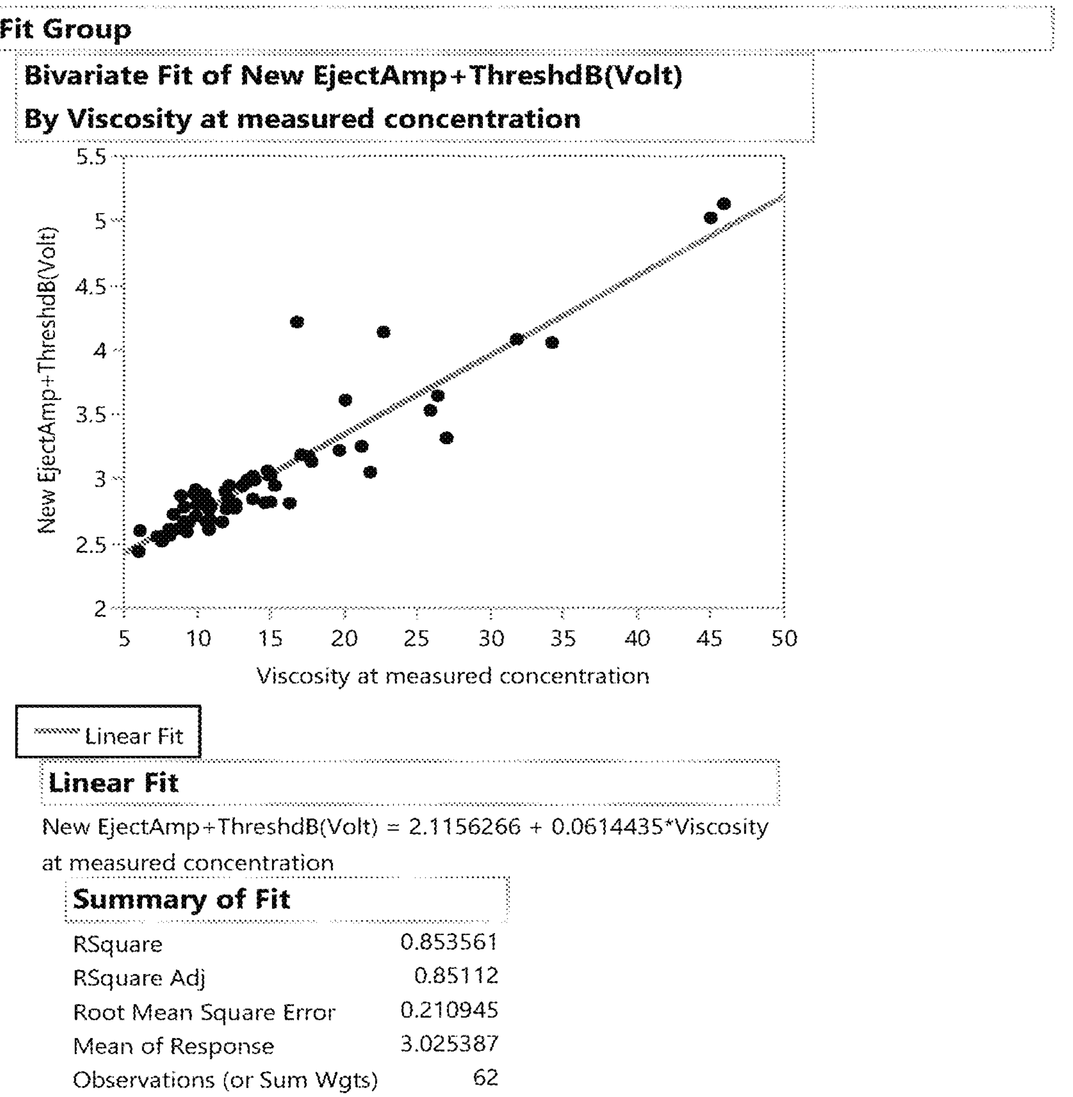

Upon further analysis, additional outputs required to move the liquid samples were shown to correlate with viscosity, including total iterations as outlined above (FIG. 3K; $R^2$=0.896908) SubEject Power (dB) required to transfer the specified amount of the sample (FIG. 3L, $R^2$=0.84986), (iii) SubEjectAmp (Volt) required to transfer the specified amount of the sample (FIG. 3M; $R^2$=0.851302), (iv) New EjectAmp (Volt) required to transfer the specified amount of the sample (FIG. 3N; $R^2$=0.873549), (v) New EjectAmp+ThreshdB (Volt) required to transfer the specified amount of the sample (FIG. 3O; $R^2$=0.853561), or (vi) Power Difference (Volt) required to transfer the specified amount of the sample (FIG. 3P; $R^2$=0.859205). Accordingly, it is contemplated that in methods and systems describe herein, in addition to total iterations required to transfer the specified amount of the sample from the first location to the second location, viscosity may be determined based on any of: SubEject Power (dB) required to transfer the specified amount of the sample (e.g., to the second location), SubEjectAmp (Volt) required to transfer the specified amount of the sample (e.g., to the second location), New EjectAmp (Volt) required to transfer the specified amount of the sample (e.g., to the second location), New EjectAmp+ThreshdB (Volt) required to transfer the specified amount of the sample (e.g, to the second location), and/or Power Difference (Volt) required to transfer the specified amount of the sample (e.g., to the second location). Accordingly, wherein viscosity determinations based on total iterations required to transfer the specified amount of the sample, it is contemplated that viscosity may also be determined based on any of: SubEject Power (dB) required to transfer the specified amount of the sample, SubEjectAmp (Volt) required to transfer the specified amount of the sample, New EjectAmp (Volt) required to transfer the specified amount of the sample, New EjectAmp+ThreshdB (Volt) required to transfer the specified amount of the sample to the second location, and/or Power Difference (Volt) required to transfer the specified amount of the sample.

Figure 3P:
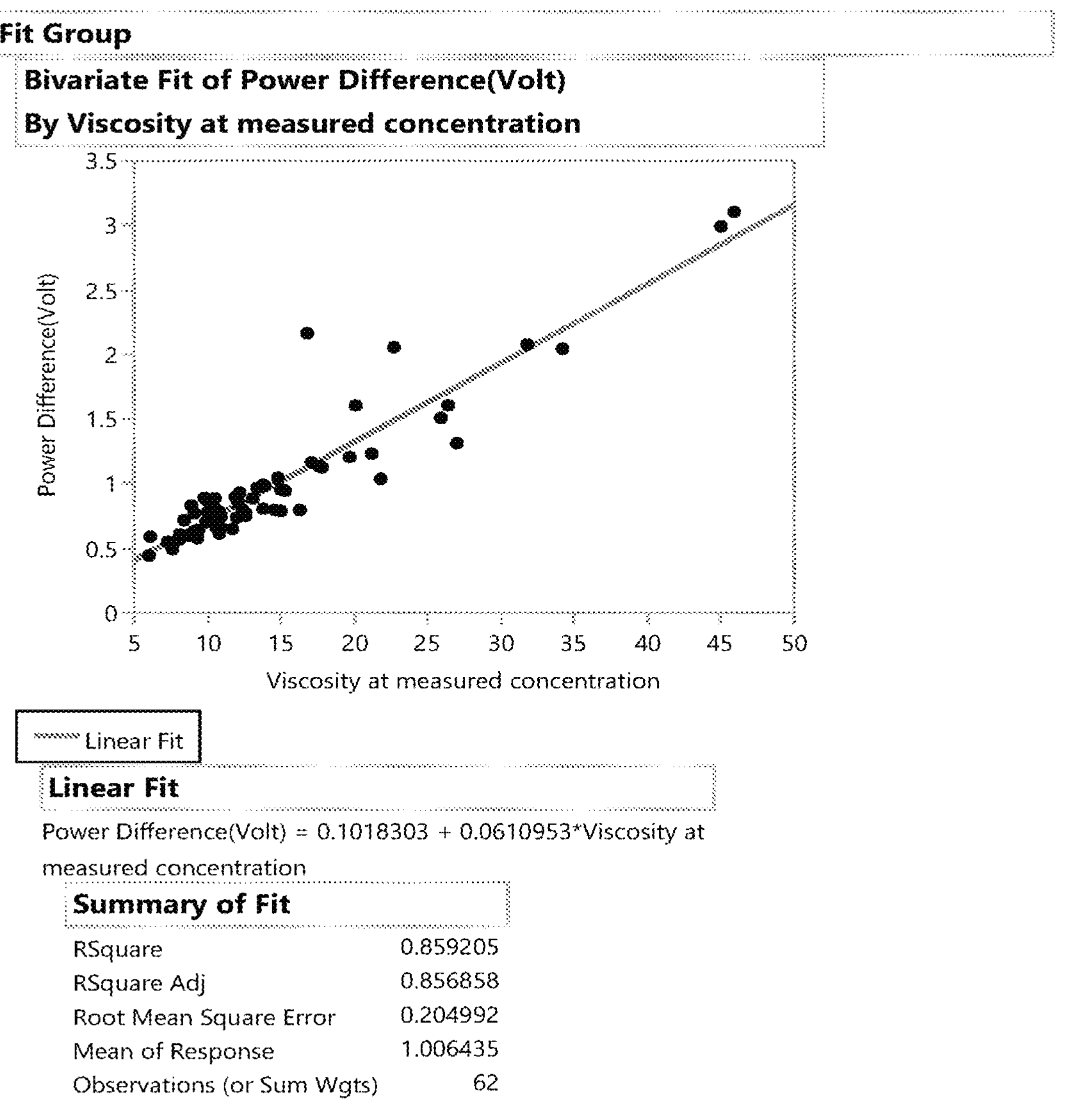

It will be appreciated from FIGS. 3A-3P that the strongest correlations (as indicated by $R^2$ value) were observed for the liquid samples 213 of higher concentrations. It will also be appreciated that correlations (as indicated by $R^2$ value) of about 0.6 or greater were observed for most of the liquid samples 213 at the first power setting and the second power setting, including $R^2$ values of about 0.9 or greater for the liquid samples 213 for the step-wise frequency increases shown in FIGS. 3H and 3J. Further, the correlation (as indicated by $R^2$ value) between the cone and plate method and the method of the present disclosure is generally tighter when using higher concentrations of protein (compare FIGS. 3G-3J at 135 to 165 mg/mL to FIGS. 3C-3F at 100 to 165 mg/mL). It is further contemplated that adjusting the step size for varying the frequency between iterations can impact the acoustic measurement of viscosity (as indicated by correlation with cone-and-plate viscosity). In some embodiments, the step size for varying the frequency between iterations is decreased (i.e., the step size is made smaller) from a default or baseline value. However, smaller step sizes may present the tradeoff of requiring more acoustic signals 217 to be tested, thereby increasing the time required to transfer the specified amount of liquid sample 213 from the first location 105 to the second location 109, and thus potentially reducing the throughput of the method of the present disclosure. It is noted, however, that even with a relatively lower throughput associated with a smaller step size (such as about 0.05 Hz per step), methods and systems described herein are still considerably faster than a conventional cone and plate assay. In any event, the obtained correlation data, especially for small step sizes and higher concentrations of liquid sample 213, demonstrate that the method and system described herein has competitive accuracy with the traditional cone and plate method.

For the data shown in FIGS. 3A-3J, 81 BTI mAbs were initially received at −10 mg/mL in A52SuT and concentrated to a target 150 mg/mL±10% using 30 kDa MW cutoff filters. Concentrations were measured using a SoloVPE and respective extinction coefficient. Viscosity Measurements were done on an Anton Paar MCR Rheometer affixed with the following geometry: 20 mm 1.988° cone plate, Peltier plate Steel—990918. Viscosities were measured using the flow sweep setting from to 1000 shear rate. Viscosity values in this study are reported at 1000 s-1. 80 μL was loaded onto the plate for each measurement. For the Echo viscosity measurements, 30 μL of each sample was loaded into a 384 well plate compatible with the Echo 550. The plate was then loaded into the Echo 550 "Source plate" location. The Echo 550 was set to transfer 50 nL of material from the source plate to a destination plate (optionally, the source plate can also be sealed, and the volume transferred to the seal; the sample does not have to go to a new plate). The number of iterations or "pings" needed to form a "Mound Image Print" (MIP) on the surface of the sample were recorded. The settings for the Echo 550 refer to the following fluid class nomenclature: B—buffer only; BP—buffer and proteins (moderate viscosity fluids and no surfactants)|min well fluid volume of 15 μL|max of 65 μL; GP—glycerol and proteins (high viscosity fluids with no surfactants)|min well fluid volume of 15 μL|max of μL; CP—protein crystallography reagents (high viscosity fluids with low level surfactants) |min well fluid volume of 25 μL|max of 50 μL. Two protocols were evaluated, BP and CP power settings, to transfer the material, both involving a stepwise increase in frequency to transfer the material. It is noted that the CP mode uses Dynamic Fluid Analysis to dynamically adjust power based on measurements of the viscosity and surface tension of the fluid in the well, a mode that is contemplated to be applicable in transferring protein crystallography reagents and other aqueous fluids that may not be transferrable by other techniques.

Figure 4:
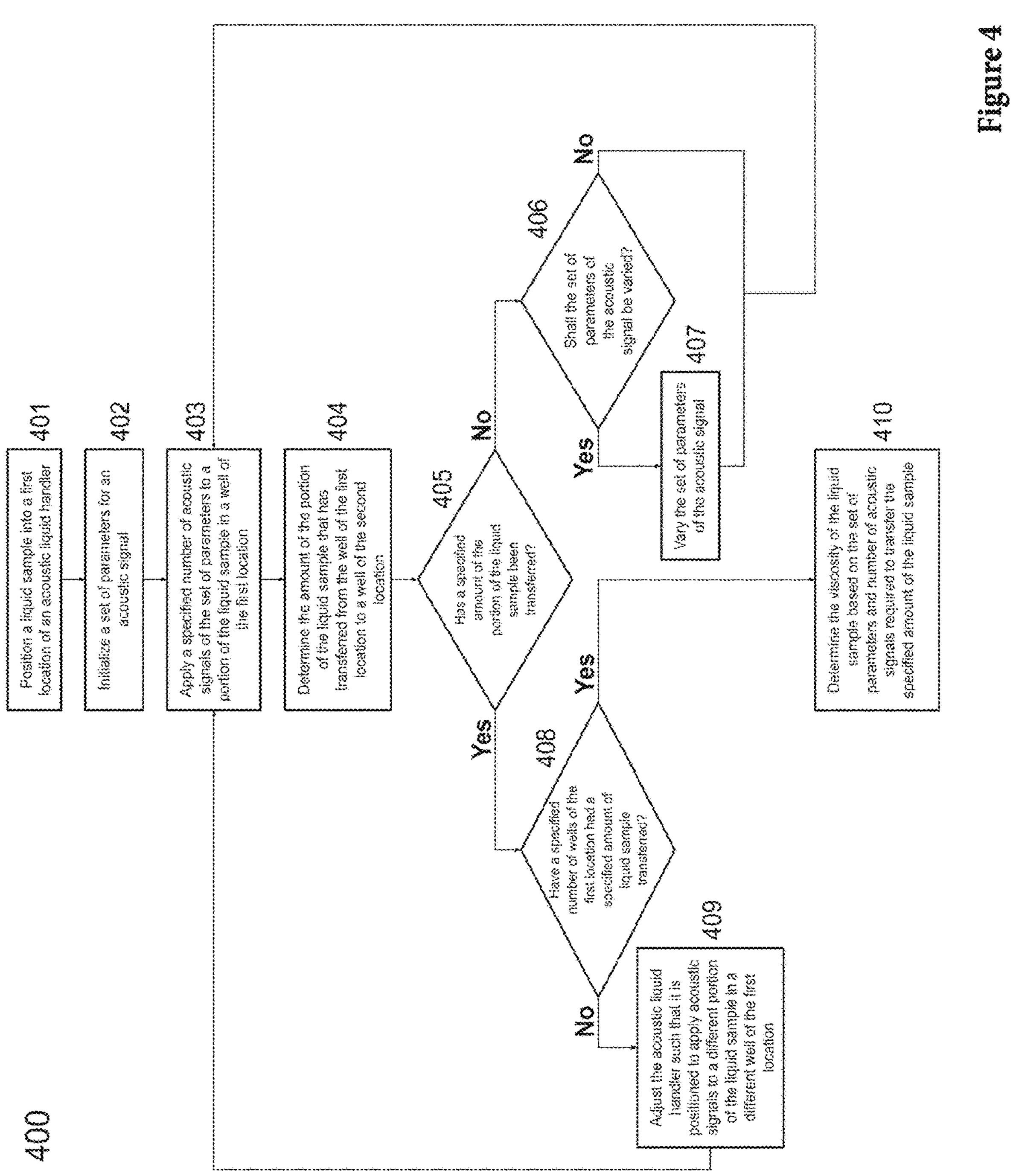
FIG. 4 is a block diagram of one example of a method of determining the viscosity of a liquid sample constructed in accordance with the principles of the present disclosure.

FIG. 4 is a block diagram of one example of an iterative method 400 of determining the viscosity of a liquid sample (e.g., the liquid sample 213) using an acoustic liquid handler (e.g., the acoustic liquid handler 101) with ADE. In the depicted method 400, the liquid sample is positioned into a first location of the acoustic liquid handler (block 401). A set of parameters of an acoustic signal are initialized (block 402) and a specified number of acoustic signals of the set of parameters is applied to a portion of the liquid sample in a well of the first location (block 403). Next, the method 400 includes determining the amount of the portion of the liquid sample that has been transferred from the well of the first location to a well of the second location (block 404). This amount is compared against a specified amount of the portion of the liquid sample to be transferred (block 405). If an insufficient amount of the portion of the liquid sample has been transferred, then the set of the acoustic signal parameters may or may not be varied (blocks 406, 407), but a specified number of acoustic signals is applied again (block 403) and the portion of the liquid sample that has been transferred is determined again (block 404). Once the specified amount of the portion of the liquid sample has been transferred (block 405), is the method 400 includes determining if a specified number of wells of the first location have had a specified amount of the portion of the liquid sample transferred (block 408). If the specified number of wells of the first location have not had a specified amount of the portion of the liquid sample transferred, the acoustic liquid handler is adjusted so as to be is positioned to apply acoustic signals to a different well of the first location (block 409) and a specified number of acoustic signals are applied again (block 403) and the portion of the liquid sample that has been transferred is determined again (this portion of the liquid sample to be transferred may be a sample having a same or a different composition and/or viscosity than the portion that was previously transferred) (block 404). Once the specified number of wells of the first location have had a specified amount of the portion of the liquid sample transferred, the method 400 includes determining the viscosity of the liquid sample based on the set of parameters and number of acoustic signals required to transfer the specified amount of the liquid sample (block 410).

It will be appreciated that while the system and method described herein are used in the context of ADE, the system and method may also be used in connection with an analytical device for performing downstream analysis (e.g., mass spectrometry, high throughput dynamic light scattering viscosity, colloidal stability measurements, and/or biotherapeutic high molecular weight analysis by size exclusion chromatography). In a first example, liquid samples may be introduced to a mass spectrometer (e.g., a high-resolution accurate-mass (HRAM) mass spectrometer) using acoustic waves, applying a similar principle of Rayleigh-Taylor instability to electrospray ionization. The disclosed system and method may in turn measure viscosity and generate mass spectrometric data. Accordingly, the system may generate viscosity data and mass spectrometry data in the same run. The system and method need not strictly use electrospray operation, however. In such an example, the system and method may pass droplets through an electric field to generate the electrospray ionization phenomenon though atmospheric pressure ionization, rather than applying an electric field to a liquid sample confined in a narrow capillary. In other examples, atmospheric pressure chemical ionization may be used. In yet other examples, Atmospheric Matrix-Assisted Laser Desorption/Ionization (MALDI) ionization may be used. The system and method could manipulate droplets on to a MALDI target plate for subsequent atmospheric MALDI-mass spectrometry analysis. As such, the system or method may determine the viscosity of the sample and further transfer the sample or a portion thereof to a mass spectrometer and perform mass spectrometric analysis.

In a second example, liquid samples may be introduced to an analytical device different from the acoustic liquid handler, such as, for example, a liquid chromatography device (e.g., an ion exchange chromatography column, a cation exchange chromatography column, an anion-exchange chromatography column), a high-performance liquid chromatography device, an ultra-high-performance liquid chromatography device, a spectrophotometric device (e.g., a UV detector), a glycan analysis device, an infrared detector, a fluorescence plate reader, another type of analytical device, or a combination thereof. The liquid samples may be introduced to the different analytical device via acoustic movement of fluid by the acoustic liquid handler. The different analytical device may be in fluid communication with the acoustic liquid handler. The disclosed system and method may in turn measure viscosity and generate downstream analytical data.

What is claimed is:

1. A method for determining a viscosity of a sample of a protein, the method comprising:

positioning the sample of the protein in a first location of an acoustic liquid handler;

applying, using the acoustic liquid handler, one or more first acoustic signals until a specified amount of the sample has been transferred from the first location to a second location of the acoustic liquid handler; and determining the viscosity of the sample based on a number of the one or more first acoustic signals required to transfer the specified amount of the sample from the first location to the second location, wherein after the specified amount of the sample has been transferred, a portion of the sample disposed within the first location is fluidly separate from a portion of the sample disposed within the second location.

2. The method of claim 1, wherein applying the one or more first acoustic signals comprises applying the one or more first acoustic signals until all or substantially all of the sample has been transferred from the first location to the second location.

3. The method of claim 1, wherein the specified amount of the sample to be transferred is sufficient to create a displacement along one or more axes on a meniscus of a portion of the sample remaining in the first location.

4. The method of claim 1, further comprising measuring an amount of the sample transferred between each of the one or more first acoustic signals using a fluid transfer measurement technique.

5. The method of claim 1, wherein determining the viscosity of the sample further comprises determining the viscosity of the sample based on a set of parameters of the first acoustic signals, and wherein the set of parameters includes at least two of a frequency, a power, an amplitude, a wavelength, a bandwidth, and a period.

6. The method of claim 5, wherein applying the one or more first acoustic signals comprises varying the set of parameters until the specified amount of sample has been transferred.

7. The method of claim 6, wherein varying the set of parameters comprises iteratively increasing the frequency of the first acoustic signals.

8. The method of claim 1, further comprising determining whether the specified amount of the sample has been transferred.

9. The method of claim 8, wherein determining whether the specified amount of the sample has been transferred comprises:

applying one or more second acoustic signals to a first portion of the sample not transferred from the first location;

determining an amount of the first portion of the sample not transferred based on the applying of the one or more second acoustic signals;

determining an amount of a second portion of the sample transferred based on the determining of the amount of the first portion of the sample not transferred; and comparing the amount of the first portion of the sample not transferred and/or the second portion of the sample transferred to the specified amount of the sample to be transferred.

10. The method of claim 1, wherein the sample has a volume of at least 12 μL and no more than 80 μL.

11. The method of claim 1, further comprising performing the method on at least 100 additional samples within two hours.

12. The method of claim 1, wherein the applying comprises iteratively applying, using the acoustic liquid handler, the one or more first acoustic signals to the sample in the first location until it is determined that the specified amount of the sample has been transferred from the first location to the second location of the acoustic liquid handler; and wherein the determining comprises determining the viscosity of the sample based on a number of iterations required to transfer the specified amount of the sample to the second location.

13. A system for determining a viscosity of a sample of a protein, the system comprising:

an acoustic liquid handler having a first location adapted to receive the sample of the protein, the acoustic liquid handler configured to apply one or more first acoustic signals to the sample of the protein in the first location until a specified amount of the sample has been transferred from the first location to a second location of the acoustic liquid handler, wherein a portion of the sample disposed within the first location is fluidly separate from a portion of the sample disposed within the second location; and a controller configured to determine the viscosity of the sample based on a number of first acoustic signals required to transfer the specified amount of the sample from the first location to the second location.

14. The system of claim 13, wherein the specified amount of the sample to be transferred is substantially all of the sample.

15. The system of claim 13, wherein the specified amount of the sample to be transferred is a minimum amount of the sample required to create a displacement along one or more axes of a meniscus of a portion of the sample remaining in the first location.

16. The system of claim 13, wherein the controller is configured to determine whether the specified amount of the sample has been transferred by:

applying one or more second acoustic signals to a first portion of the sample not transferred from the first location;

determining an amount of the first portion of the sample not transferred based on the application of the one or more second acoustic signals;

determining an amount of a second portion of the sample transferred based on the determination of the amount of the first portion of the sample not transferred; and comparing the amount of the second portion of the sample transferred and/or the first portion of the sample not transferred to the specified amount of the sample to be transferred.

17. The system of claim 13, wherein the controller determines the viscosity of the sample by analyzing a predetermined relationship between the number of the one or more first acoustic signals and the viscosity.

18. The system of claim 13, wherein the controller is further configured to determine the viscosity of the sample based on a set of parameters of the first acoustic signals, and wherein the set of parameters includes at least two of a frequency, a power, an amplitude, a wavelength, a bandwidth, and a period.

19. A method for determining a viscosity of a sample of a protein, the method comprising:

positioning the sample of the protein in a first location of an acoustic liquid handler;

applying, using the acoustic liquid handler, one or more first acoustic signals until a specified amount of the sample has been transferred from the first location to a second location of the acoustic liquid handler; and determining the viscosity of the sample based on a number of the one or more first acoustic signals required to transfer the specified amount of the sample from the first location to the second location, wherein the positioning includes positioning the sample of the protein in a first well of the first location of the acoustic liquid handler, and wherein the applying includes applying the one or more acoustic signals until the specified amount of the sample has been transferred from the first well of the first location to a second well of the second location of the acoustic liquid handler.

20. The method of claim 19, wherein applying the one or more first acoustic signals further includes applying the one or more first acoustic signals until all or substantially all of the sample has been transferred from the first location to the second location.

21. The method of claim 19, wherein the specified amount of the sample to be transferred is sufficient to create a displacement along one or more axes on a meniscus of a portion of the sample remaining in the first location.

22. The method of claim 19, further comprising determining whether the specified amount of the sample has been transferred.

23. A method for determining a viscosity of a sample of a protein, the method comprising:

positioning the sample of the protein in a first location of an acoustic liquid handler;

applying, using the acoustic liquid handler, one or more first acoustic signals until a specified amount of the sample has been transferred from the first location to a second location of the acoustic liquid handler; and determining the viscosity of the sample based on a number of the one or more first acoustic signals required to transfer the specified amount of the sample from the first location to the second location, wherein determining the viscosity of the sample further comprises determining the viscosity of the sample based on a set of parameters of the first acoustic signals, wherein the set of parameters includes at least two of a frequency, a power, an amplitude, a wavelength, a bandwidth, and a period, and wherein the one or more first acoustic signals each have a frequency in the range of 1 mHz to 5 mHz.

24. A method for determining a viscosity of a sample of a protein, the method comprising:

positioning the sample of the protein in a first location of an acoustic liquid handler;

applying, using the acoustic liquid handler, one or more first acoustic signals until a specified amount of the sample has been transferred from the first location to a second location of the acoustic liquid handler;

determining the viscosity of the sample based on a number of the one or more first acoustic signals required to transfer the specified amount of the sample from the first location to the second location; and generating mass spectrometric data on the sample, wherein the one or more first acoustic signals transfer the sample or a portion of the sample thereof to a mass spectrometer.

25. A method for determining a viscosity of a sample of a protein, the method comprising:

positioning the sample of the protein in a first location of an acoustic liquid handler;

applying, using the acoustic liquid handler, one or more first acoustic signals until a specified amount of the sample has been transferred from the first location to a second location of the acoustic liquid handler;

determining the viscosity of the sample based on a number of the one or more first acoustic signals required to transfer the specified amount of the sample from the first location to the second location; and determining whether the specified amount of the sample has been transferred, wherein determining whether the specified amount of the sample has been transferred comprises:

applying one or more second acoustic signals to a first portion of the sample not transferred from the first location;

determining an amount of the first portion of the sample not transferred based on the application of the one or more second acoustic signals;

determining an amount of a second portion of the sample transferred based on the determining of the amount of the first portion of the sample not transferred; and comparing the amount of the second portion of the sample transferred and/or the first portion of the sample not transferred to the specified amount of the sample to be transferred.

* * * * *